(12) United States Patent
Gaudreau, Jr.

(10) Patent No.: US 10,099,595 B2
(45) Date of Patent: Oct. 16, 2018

(54) CHILD RESTRAINT WITH CUPHOLDER

(71) Applicant: Dorel Juvenile Group, Inc., Foxboro, MA (US)

(72) Inventor: Paul D. Gaudreau, Jr., Indianapolis, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 350 days.

(21) Appl. No.: 14/848,905

(22) Filed: Sep. 9, 2015

(65) Prior Publication Data

US 2015/0375660 A1    Dec. 31, 2015

Related U.S. Application Data

(62) Division of application No. 13/470,191, filed on May 11, 2012, now Pat. No. 9,162,600.

(60) Provisional application No. 61/484,950, filed on May 11, 2011.

(51) Int. Cl.
| | |
|---|---|
| *B60N 3/10* | (2006.01) |
| *B60N 2/75* | (2018.01) |
| *B60N 2/28* | (2006.01) |
| *B60N 2/26* | (2006.01) |

(52) U.S. Cl.
CPC .............. *B60N 3/108* (2013.01); *B60N 2/26* (2013.01); *B60N 2/28* (2013.01); *B60N 2/286* (2013.01); *B60N 2/2866* (2013.01); *B60N 2/2872* (2013.01); *B60N 2/2881* (2013.01); *B60N 2/2884* (2013.01); *B60N 2/75* (2018.02); *B60N 2/79* (2018.02); *B60N 3/10* (2013.01); *B60N 3/103* (2013.01)

(58) Field of Classification Search
CPC .... A47G 23/0266; B60N 3/108; B60N 3/103; B60N 3/10; B60N 2/79; B60N 2/28
See application file for complete search history.

(56) References Cited

U.S. PATENT DOCUMENTS

| | | |
|---|---|---|
| 3,586,368 A | 6/1971 | Guild |
| 3,675,969 A | 7/1972 | Gage |
| 4,508,303 A | 4/1985 | Beckerer, Jr. |
| 5,052,649 A | 10/1991 | Hunnicutt |
| 5,088,673 A | 2/1992 | Chandler |
| 5,282,598 A | 2/1994 | Greene |
| 5,330,145 A | 7/1994 | Evans et al. |
| 5,667,180 A | 9/1997 | Duckworth |
| 5,685,604 A | 11/1997 | Kain |
| 5,695,162 A | 12/1997 | DiCastro |
| 5,720,516 A | 2/1998 | Young |
| 6,062,640 A | 5/2000 | Stahl |
| 6,467,839 B1 | 10/2002 | Kain |
| 6,478,372 B1 | 11/2002 | Lemmeyer et al. |
| 6,550,862 B2 | 4/2003 | Kain |
| 6,592,180 B2 | 7/2003 | Combs |
| 6,612,649 B2 | 9/2003 | Kain |
| 6,644,524 B1 | 11/2003 | Garvin |

(Continued)

*Primary Examiner* — David R Dunn
*Assistant Examiner* — Tania Abraham
(74) *Attorney, Agent, or Firm* — Barnes & Thornburg LLP

(57) ABSTRACT

According to the present disclosure, a child restraint includes a juvenile seat and a child-restraint harness coupled to the juvenile seat. The juvenile seat includes a seat bottom and a seat back extending upwardly from the seat bottom. The juvenile seat further includes a cupholder coupled to the seat bottom.

13 Claims, 17 Drawing Sheets

(56) References Cited

U.S. PATENT DOCUMENTS

| | | |
|---|---|---|
| 6,857,700 B2 | 2/2005 | Eastman et al. |
| 6,997,509 B2 | 2/2006 | Kain |
| 7,147,192 B2 * | 12/2006 | Kong ................ B60N 3/108 |
| | | 248/311.2 |
| RE40,010 E | 1/2008 | Kain |
| 7,360,830 B2 | 4/2008 | Balensiefer et al. |
| 7,584,867 B2 | 9/2009 | Burbrink |
| 7,850,236 B2 | 12/2010 | Chen et al. |
| 2009/0267375 A1 * | 10/2009 | Vander Sluis ......... B60N 3/103 |
| | | 296/37.8 |

\* cited by examiner

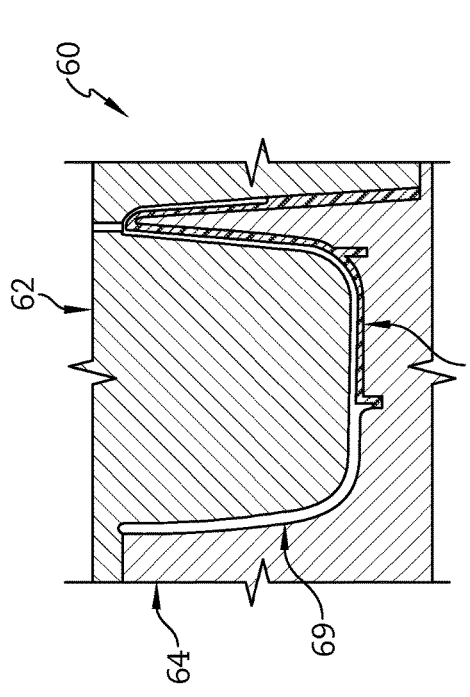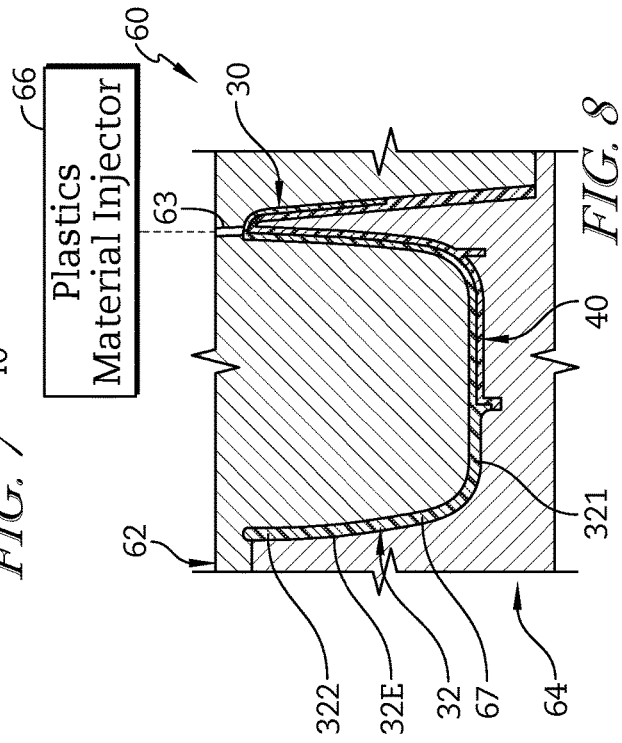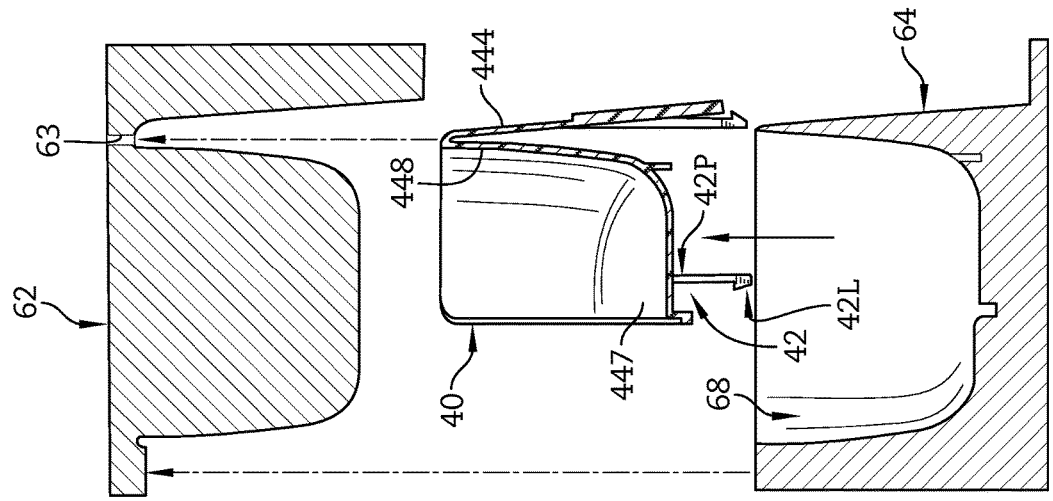

CHILD RESTRAINT WITH CUPHOLDER

PRIORITY CLAIM

This application is a divisional of U.S. application Ser. No. 13/470,191, filed May 11, 2012 which claims priority under 35 U.S.C. § 119(e) to U.S. Provisional Application Ser. No. 61/484,950, filed May 11, 2011, each of which is expressly incorporated by reference herein.

BACKGROUND

The present disclosure relates to child restraints, and in particular to juvenile seats for use on passenger seats in vehicles. More particularly, the present disclosure relates to a cupholder included in a juvenile seat.

SUMMARY

According to the present disclosure, a child restraint includes a juvenile seat and a child-restraint harness coupled to the juvenile seat. The juvenile seat includes a seat bottom and a seat back extending upwardly from the seat bottom.

In illustrative embodiments, the juvenile seat includes a first armrest configured to be mounted on the seat bottom. The first armrest includes a cupholder made of an elastic deformable material and mounted on an underlying cupholder support that is configured to be anchored to the seat bottom. The cupholder support is made of a relatively rigid material and is coupled to the seat bottom to elevate the cupholder relative to a central seat pad included in the seat bottom.

The deformable cupholder is formed to include a cup-receiving cavity. A portion of the deformable cupholder is unsupported by the cupholder support and is free to deform elastically and move relative to the cupholder support when exposed to certain external impact forces.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 6 is a sectional view of a plastic injection mold having an upper mold portion and a lower mold portion, here shown spaced apart in an opened position, and also showing the cupholder support (made, for example, of a rigid plastics material) before it is inserted into the lower mold portion;

FIG. 7 is a sectional view similar to FIG. 6 showing that the cupholder support has been prepositioned in a mold cavity formed between the upper and lower mold portions prior to injection of an elastic deformable plastics material into the mold cavity;

FIG. 8 is a sectional view similar to FIG. 7 showing that the elastic deformable plastics material has been injected into the mold cavity to overmold the cupholder onto the cupholder mount to form a round cup-receiver supported in part on the cupholder support and a receiver mount coupled to the round cup receiver and supported in full on the cupholder support;

DETAILED DESCRIPTION

Figure 1:
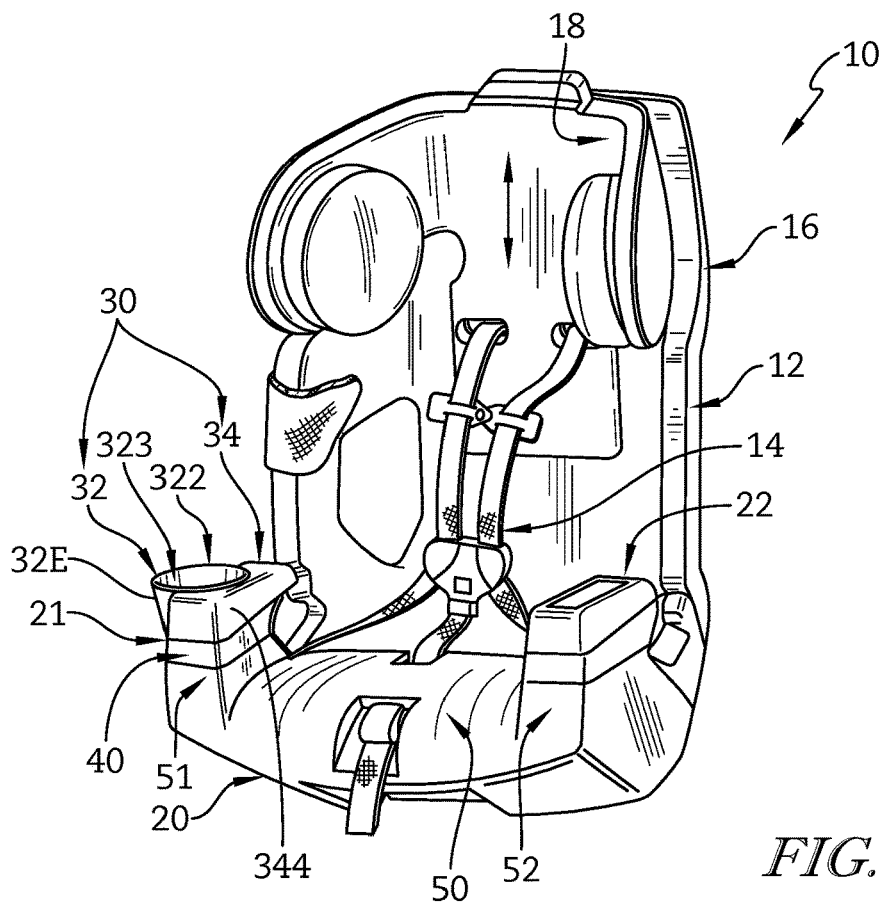
FIG. 1 is a perspective view of a child restraint including a cupholder made of an elastic deformable material in accordance with a first embodiment of the present disclosure showing a juvenile seat having first and second armrests and a seat bottom coupled to the armrests and formed to include a seat pad located between the armrests and showing that the cupholder is included in the first armrest.

An illustrative child restraint 10 comprises a juvenile seat 12 and a child-restraint harness 14 coupled to juvenile seat 12 as shown in FIG. 1. Juvenile seat 12 includes a seat bottom 20 and first and second armrests 21, 22 coupled to seat bottom 20. As suggested in FIG. 3, a cupholder 30 can be coupled to an underlying cupholder support 40 using, for example, an overmolding process illustrated in FIGS. 6-8 to produce an illustrative first armrest 21 shown in FIG. 2 and configured to be mounted on seat bottom 20 as suggested in FIGS. 1 and 3. Cupholder 30 is made of an elastic deformable material and includes a cup receiver 32, a portion of which is configured to deform elastically when exposed to certain external impact forces $F_1$ and $F_2$ as shown, for example, in FIGS. 4 and 5. Another illustrative child restraint 110 having a different first armrest 121 formed to include another kind of cupholder 130 is shown in FIGS. 9-13. Yet another illustrative child restraint 210 having a different first armrest 221 formed to include another type of cupholder (cup receiver) 230 is shown in FIGS. 15-24.

Juvenile seat 12 also includes a seat back 16 arranged to extend upwardly from seat bottom 20 and a headrest 18 mounted for up-and-down movement on seat back 16 as suggested in FIG. 1. In an illustrative embodiment, child-restraint harness 14 is coupled to seat back 16, headrest 18, and seat bottom 20.

Seat bottom 20 includes a first-armrest foundation 51 under first armrest 21, a second-armrest foundation 52 under second armrest 22, and a seat pad 50 arranged to extend between foundations 51, 52 as shown, for example, in FIG. 1. In an illustrative embodiment, first armrest 21 is retained in a stationary position on underlying first-armrest foundation 51 to elevate cup receiver 32 above seat pad 50 as shown in FIG. 1. Second armrest 22 is retained in a stationary position on underlying second-armrest foundation 52 as also shown in FIG. 1.

An exterior portion 32E of cup receiver 32 of cupholder 30 is arranged to extend away from seat pad 50 and second armrest 22 on second-armrest foundation 52 as suggested in FIG. 1. This exterior portion 32E of cup receiver 32 can deform elastically when exposed to external impact forces $F_1$ or $F_2$ as suggested in FIGS. 4 and 5 without impairing long-term cup-receiving functionality of cup receiver 32.

Figure 2:
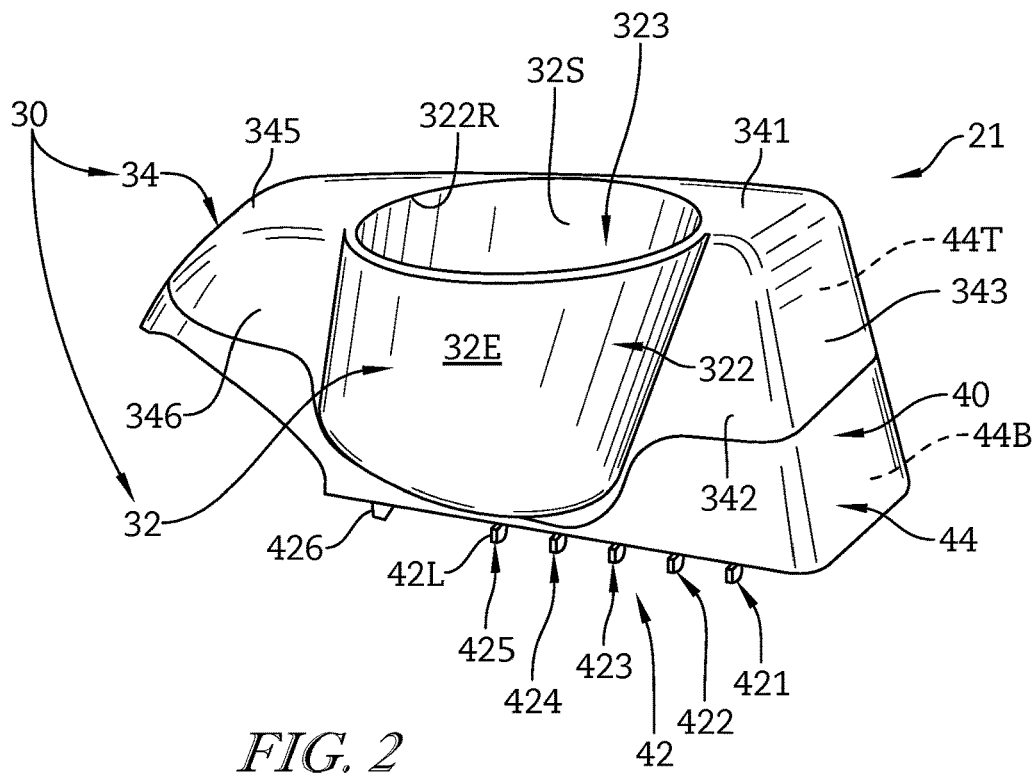
FIG. 2 is an enlarged perspective view of the first armrest of FIG. 1 before it is mounted on an underlying first-armrest foundation included in the seat bottom.
Figure 3:
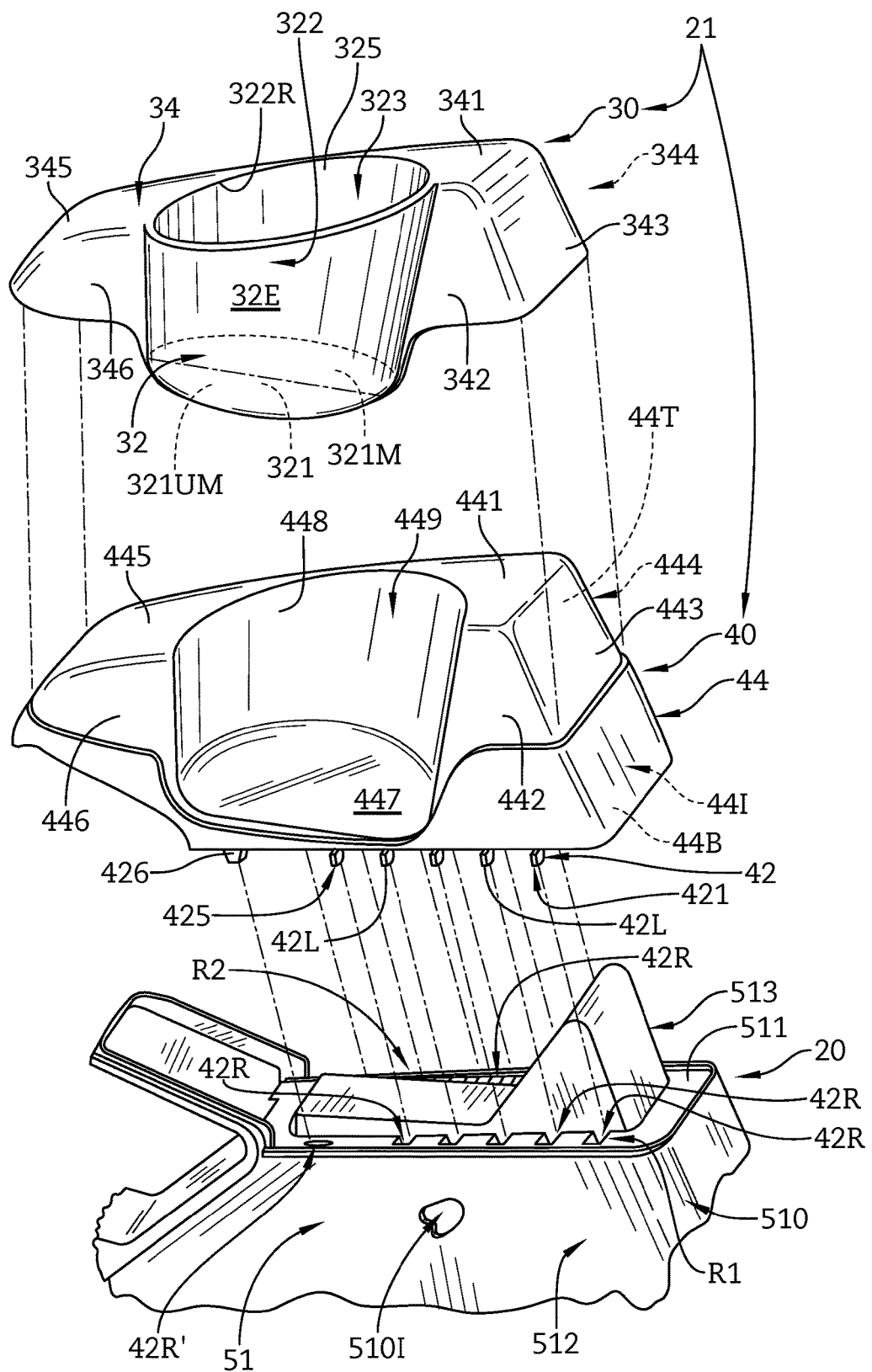
FIG. 3 is an exploded perspective assembly view showing the elastic deformable cupholder before it is mounted on an underlying cupholder support to form the first armrest shown in FIG. 2 and showing the underlying first-armrest foundation included in the seat bottom.

Cupholder 30 includes cup receiver 32 and a receiver mount 34 appended to cup receiver 32 as shown, for example, in FIGS. 1-3. In illustrative embodiments, cupholder 30 is a monolithic component made of a deformable elastic material to provide exterior portion 32E of cup receiver 32 with a deformable elastic quality.

Cupholder support 40 includes a base 44 and a base anchor 42 coupled to base 44 and configured to mate with first-armrest foundation 51 to retain cupholder support 40 in a stationary position on first-armrest foundation 51 as suggested in FIGS. 1 and 3. In illustrative embodiments, base 44 is made of a substantially rigid material to support most of cupholder 30 thereon but without hindering elastic deformation of exterior portion 32E of cup receiver 32 during exposure to external impact forces, e.g., $F_1$ and $F_2$, as suggested in FIGS. 4 and 5. As suggested in FIGS. 2-5, most of cupholder 30 is mounted in a stationary position on underlying portions of cupholder support 40 during, for example, an overmolding process shown in FIGS. 6-8, to form a first armrest 21 that is configured to be mounted on the underlying first-armrest foundation 51 as suggested in FIGS. 1 and 3.

Figure 4:
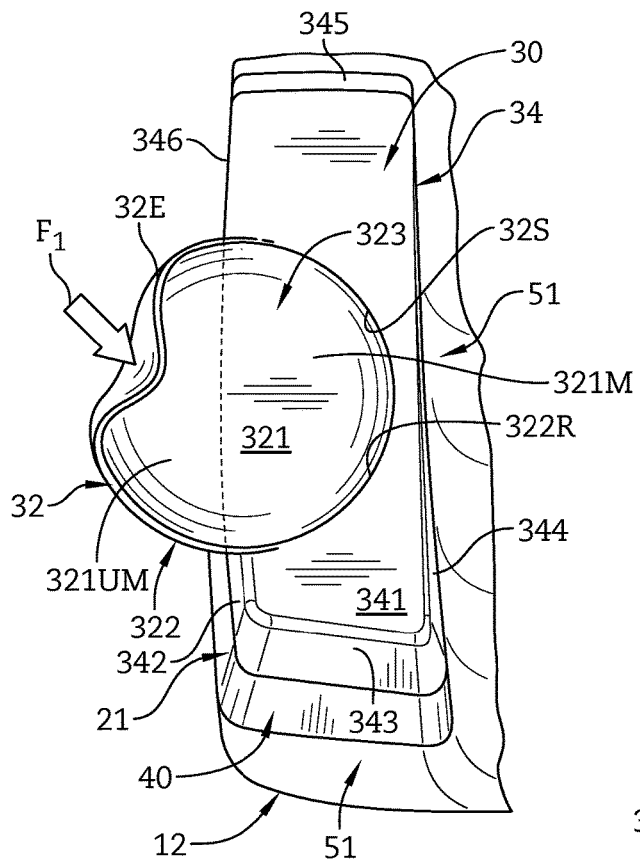
FIG. 4 is an enlarged top plan view of a portion of the child restraint of FIG. 1 showing the first armrest in a mounted position on top of the first-armrest foundation and showing elastic deformation of a round cup receiver formed in the elastic deformable cupholder in response to application of an external force to an outer portion of the cup receiver unsupported by the cupholder support.
Figure 5:
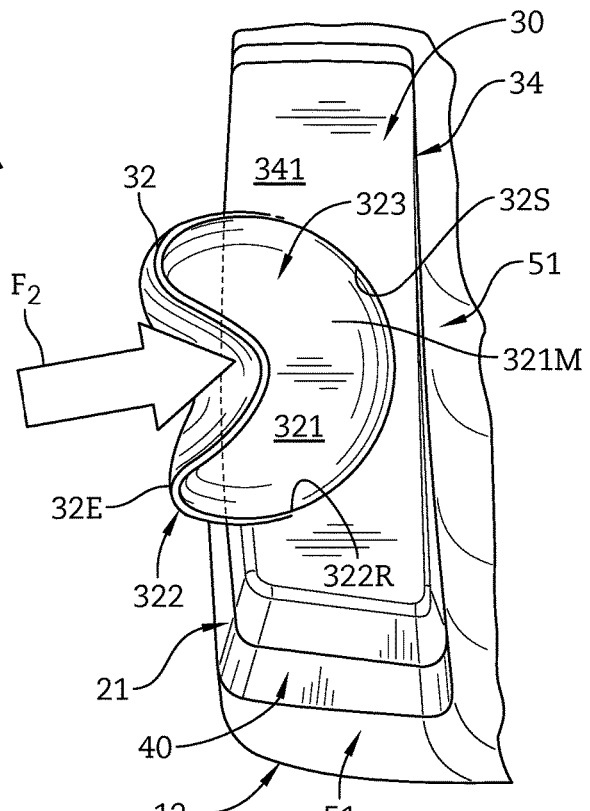
FIG. 5 is a view similar to FIG. 4 showing elastic deformation of the round cup receiver in response to another and greater external force.

Cup receiver 32 of cupholder 30 includes a round floor 321 and a side wall 322 coupled to a perimeter edge of floor 321 as shown in FIGS. 4 and 5. Side wall 322 and floor 321 cooperate to form a cup-receiving cavity 323 as shown, for example, in FIGS. 1-5. As suggested in FIG. 3, mounted portions of floor 321 and side wall 322 of cup receiver 32 are arranged to mate with companion surfaces on base 44 of cupholder support 40 when cupholder 30 is overmolded onto cupholder support 40. Unmounted portions of floor 321 and side wall 322 are not mated to cupholder support 40 and cooperate to define exterior portion 32E of cup receiver 32.

Receiver mount 34 of cupholder 30 is coupled to side wall 322 of cup receiver 32 as suggested in FIGS. 3-5. Receiver mount 34 includes a top wall 341 coupled to a top rim 322R of side wall 322, a forward outer side wall 342, a front side wall 343, an inner side wall 344, a rear side wall 345, and a rearward outer side wall 346 as shown, for example, in FIGS. 3 and 4. As suggested in FIG. 3, each of top wall 341 and side walls 342-346 is arranged to mate with a companion surface on base 44 of cupholder support 40 when cupholder 30 is overmolded onto cupholder support 40. Side walls 342-346 are arranged to extend in sequence around base 44 starting at a forward-facing portion of side wall 322 of cup receiver 32 and ending at a rearward-facing portion of side wall 322 of cup receiver 32 as suggested in FIGS. 3 and 4.

Base 44 of cupholder support 40 includes a top wall 441, a forward outer side wall 442, a front side wall 443, an inner side wall 444, a rear side wall 445, and a rearward outer side wall 446 as shown, for example, in FIG. 3. Each of these walls 441-446 in base 44 of cupholder support 40 is arranged to mate with a companion one of walls 341-346 in receiver mount 34 of cupholder 30 when cupholder 30 is mounted on cupholder support 40 as suggested in FIG. 3.

Base 44 of cupholder support 40 further includes a floor-support wall 447 and a side-support wall 448 arranged to extend from a C-shaped perimeter edge of floor-support wall 447 to a C-shaped edge of top wall 441 as shown, for example, in FIG. 3. In illustrative embodiments, side-support wall 448 is a concave curved surface configured to mate with a mounted portion of curved side wall 322 of cup receiver 32 as suggested in FIGS. 2 and 3. Also in illustrative embodiments, floor-support wall 447 is substantially flat and configured to mate with a mounted portion of round floor 321 of cup receiver 32 as suggested in FIGS. 2 and 3.

Base anchor 42 of cupholder support 40 is configured to provide means for retaining base 44 of cupholder support 40 in a stationary position on first-armrest foundation 51 as suggested in FIGS. 1 and 3. In an illustrative embodiment, base anchor 42 comprises several support anchors 421-425 and a support locator 426 as shown, for example, in FIGS. 2 and 3. Each of support anchors 421-425 includes a retention lug 42L and a lug-carrier post 42P as shown best in FIG. 6. An upper end of each lug-carrier post 42P is coupled to base 44 and a lower end of each lug-carrier post 42P is coupled to a companion retention lug 42L. In illustrative embodiment, there is a first locator 426 and a first set of anchors 421-425 on an outer side of base 44 and a second locator 426 and a second set of anchors 421-425 on an inner side of base 44.

First-armrest foundation 51 is arranged to rise upwardly along one side of seat pad 50 and mate with first armrest 21 to support first armrest 21 above and alongside seat pad 50 as shown, for example, in FIG. 1. As suggested in FIG. 3, first-armrest foundation 51 includes ridge 510 having a top plate 511 and a side wall 512 coupled to and arranged to extend downwardly from top plate 511. First-armrest foundation 51 also includes an upstanding rigidifier 513 coupled to top plate 511 and arranged to extend upwardly away from side wall 512 and into an interior region 44I formed in base 44 of cupholder support 40 as suggested in FIGS. 1 and 3.

Top plate 511 of first-armrest foundation 51 is formed to include an anchor receiver 42R for each of the support anchors 421-425 and a locator receiver 42R' for each support locator 426 as suggested in FIG. 3. In an illustrative embodiment, there is first row R1 of receivers 42R, 42R' along side an outer portion of upstanding rigidifier 513 and a second row R2 of receivers 42R, 42R' arranged to lie in spaced-apart relation to the first row R1 and alongside an inner portion of upstanding rigidifier 513 as suggested in FIG. 3.

Each anchor receiver 42R and locator receiver 42R' is arranged to open into an interior region 510I formed in ridge 510 of first-armrest foundation 51 as suggested in FIG. 3. In illustrative embodiments, when base 44 of cupholder support 40 is mounted on underlying first-armrest foundation 51 as suggested in FIG. 3, each support locator 426 is inserted into a companion locator receiver 42R' to orient base 44 properly relative to first-armrest foundation 51 and each support anchor 421-425 is inserted into a companion anchor receiver 42R to cause each retention lug 42L to snap into engagement with an underside portion of top plate 511 bordering the companion anchor receiver 42R. In this retained position, upstanding rigidifier 513 in first-armrest foundation 51 extends upwardly into an interior region 44I formed in base 44 to rigidify first armrest 21 in its mounted position on first-armrest foundation 51.

In illustrative embodiments, first armrest 21 is molded using plastic injection mold 60 as shown in FIGS. 6-8. Mold 60 includes an upper mold portion 62 and a lower mold portion 64. Upper and lower mold portions 62, 64 are movable relative to one another from an opened position shown in FIG. 6 to a closed position shown in FIG. 7. A plastics material injector 66 is provided for injecting a deformable elastic plastics material 67 into mold 60 in its closed position.

Lower mold portion 64 is formed to include a support-receiving cavity 68 as shown in FIG. 6. Cupholder support 40 is pre-molded and inserted into support-receiving cavity 68 of lower mold portion 64 when mold 60 is in the opened position as suggested in FIG. 6. Upper and lower mold portions 62, 64 are then moved toward one another to close mold 60 as suggested in FIGS. 6 and 7.

Once mold 60 is closed, plastics material injector 66 is used to inject plastics material 67 through a channel 63 formed, for example, in upper mold portion 62 to fill a cupholder-forming cavity 69 as suggested in FIG. 8. The result is that cupholder 30 is overmolded onto cupholder support 40 to produce first armrest 21.

Juvenile seat 12 includes a seat bottom 20, a cupholder support 40 coupled to seat bottom 20, and a cupholder 30 mounted on cupholder support 40 as shown in FIG. 1. Cupholder 30 includes a cup receiver 32 having a floor 321 and a side wall 322 arranged to cooperate with floor 321 to form a cup-receiving cavity 323 as suggested in FIG. 2. Side wall 322 includes a first deformable portion 32E that is arranged to extend away from cupholder support 40 so as to be unsupported by cupholder support 40. Side wall 322 is configured to provide first crumple means in side wall 322 for deforming elastically to change from an initial shape and move relative to floor 321 to assume a different temporary shape and reduce a volume of cup-receiving cavity 323 temporarily only during exposure of the first deformable portion 32E to an external impact force as suggested in FIGS. 4 and 5 and for returning to the initial shape following cessation of the external impact force as suggested in FIGS. 1 and 2.

Cupholder 30 is a monolithic component made of a deformable elastic material to provide the first deformable exterior portion of cup receiver 32 with a deformable elastic quality. Cupholder 30 is overmolded onto cupholder support 40 as suggested in FIGS. 6-8 to locate the first deformable portion in spaced-apart relation to the cupholder to free the first deformable portion to move relative to cupholder support 40 during exposure to the external impact force as suggested in FIGS. 1, 4, and 5.

Cupholder 30 and cupholder support 40 cooperate to define a first armrest 21 as suggested in FIGS. 1 and 2. Cupholder support 40 includes a base 40 configured to mate with and support cupholder 30 without hindering elastic deformation of the first deformable portion of cup receiver 32 relative to floor 321 of cup receiver 32 as suggested in FIGS. 4 and 5. Cupholder support 40 further includes a base anchor 42 coupled to base 40 and configured to provide means for mating with a first-armrest foundation 51 included in seat bottom 20 during a manufacturing process to retain cupholder support 40 in a stationary position on first-armrest foundation 51 as suggested in FIGS. 1-3.

Cupholder support 40 includes a top portion 44T arranged to lie above and in spaced-apart relation to first-armrest foundation 51 and a bottom portion 44B arranged to interconnect the top portion and base anchor 42 as suggested in FIG. 2. Cupholder 30 further includes a receiver mount 34 made of deformable elastic material and coupled to each of top portion 44T of cupholder support 40 and to cup receiver 32 to locate first deformable portion 32E of cup receiver 32 in spaced-apart relation to cupholder support 40.

Seat bottom 20 further includes a second armrest 22 arranged to lie in spaced-apart relation to first armrest 21 and a seat pad 50 located between first and second armrests 21, 22 as shown in FIG. 1. Side wall 322 of cup receiver 32 further includes a stationary portion 32S arranged to abut base 44 of cupholder support 40 and interconnect opposite ends of first deformable portion 32E to cooperate with first deformable portion 32E to define side wall 322 of cup receiver 32. Receiver mount 34 includes, in series, a forward outer side wall 342 arranged to face away from second armrest 22 and coupled to a forward edge of stationary portion 32S of side wall 322 of cup receiver 32, a front side wall 343, an inner side wall 344 arranged to face toward second armrest 22, a rear side wall 345, and a rearward outer side wall 346 arranged to face away from second armrest 22 and coupled to a rearward edge of the stationary portion of side wall 322 of cup receiver 32. Receiver mount 34 further includes a top wall 341 arranged to interconnect each of forward outer side wall 342, front side wall 343, inner side wall 344, rear side wall 345, rearward outer side wall 346, and stationary portion 32S of side wall 322 of cup receiver 32.

Stationary portion 32S of side wall 322 of cup receiver 32 and each of the forward outer side wall 342, front side wall 343, inner side wall 344, rear side wall 345, rearward outer side wall 346, and top wall 341 of receiver mount 34 is overmolded onto top portion 40T of cupholder support 40 to locate first deformable portion 32E of cup receiver 32 in spaced-apart relation to cupholder support 40. This arrangement frees first deformable portion 32E of cup receiver 32 to move relative to cupholder support 40 toward stationary portion 32S of side wall 322 of cup receiver 32 during exposure to the external impact force as suggested in FIGS. 4 and 5.

Seat bottom 20 further includes a second-armrest foundation 52 arranged to lie in spaced-apart relation to first-armrest foundation 51 and a seat pad 50 located between first-armrest and second-armrest foundations 51, 52 as suggested in FIG. 1. Second armrest 22 is coupled to second-armrest foundation 52 to lie in spaced-apart relation to first armrest 21 defined by cupholder 30 and cupholder support 40. First-armrest foundation 51 is formed to include an upwardly opening anchor receiver 42R. Base anchor 42 included in cupholder support 40 is arranged to extend downwardly into the upwardly opening anchor receiver 42R formed in first-armrest foundation 51 to couple cupholder support 40 to seat bottom 20 as suggested in FIGS. 2 and 3. Base anchor 42 is configured to provide means for retaining base 44 of cupholder support 40 in a stationary position on first-armrest foundation 51 in response to movement of cupholder support 40 to engage first-armrest foundation 51.

First-armrest foundation 51 includes a ridge 50 having a top plate 511 and a side wall 512 coupled to and arranged to extend downwardly from top plate 511 toward ground underlying seat bottom 20 and an upstanding rigidifier 513 coupled to top plate 511 and arranged to extend upwardly away from side wall 512 and into an interior region formed in base 44 of cupholder support 40 as suggested in FIG. 3. Upstanding rigidifier 513 provides means for rigidifying cupholder support 40 when cupholder support 40 is coupled to first-armrest foundation 51 of seat bottom 20.

Cupholder support 40 includes a floor-support wall 447 and a side-support wall 448 arranged to extend upwardly from floor-support wall 447 as suggested in FIG. 3. Side-support wall 448 cooperates with floor-support wall 447 to form a support cavity 449 receiving an inner section of cup receiver 32 to cause an outer section of cup receiver 32 including first deformable portion 32E of side wall 322 of cup receiver 32 to lie outside support cavity 449 to free first deformable portion 32E to move relative to cupholder support 40 during exposure to the external impact force as suggested in FIGS. 4 and 5.

Floor 321 of cup receiver 32 includes a mounted portion 321M arranged to lie in a stationary position on floor-support wall 447 of cupholder support 40 and an unmounted portion 321UM coupled to first deformable portion 32E of side wall 322 of cup receiver 32 and arranged to end away from cupholder support 40 to lie outside of support cavity 449 formed in cupholder support 40 as suggested in FIG. 4. Each of the mounted and unmounted portions 321M, 321UM of floor 321 of cup receiver 32 is a D-shaped half-round segment and those D-shaped half-round segments mate in back-to-back relation to provide floor 321 with a round shape as suggested in FIGS. 3 and 4. The unmounted portion 321UM of floor 321 of cup receiver 32 is unsupported by cupholder support 40 and is configured to provide floor crumple means for deforming elastically to change shape from an initial shape and move relative to mounted portion 321M of floor 321 of cup receiver 32 to assume a different temporary shape during exposure of first deformable portion 32E to an external impact force as suggested in FIGS. 4 and 5 and for returning to the initial shape of unmounted portion 321UM of floor 321 of cup receiver 32 following cessation of the external impact force as suggested in FIGS. 1-3.

Cupholder support 40 includes a base 44 including floor-support wall 447 and side-support wall 448 and a base anchor 42 coupled to base 44 and to seat bottom 20 to retain cupholder support 40 in a stationary position on seat bottom 20. Base 44 is made of a substantially rigid material to support the inner section of cup receiver 32 of cupholder 30 thereon without substantially hindering elastic deformation of the first deformable portion of cup receiver 32.

Figure 9:
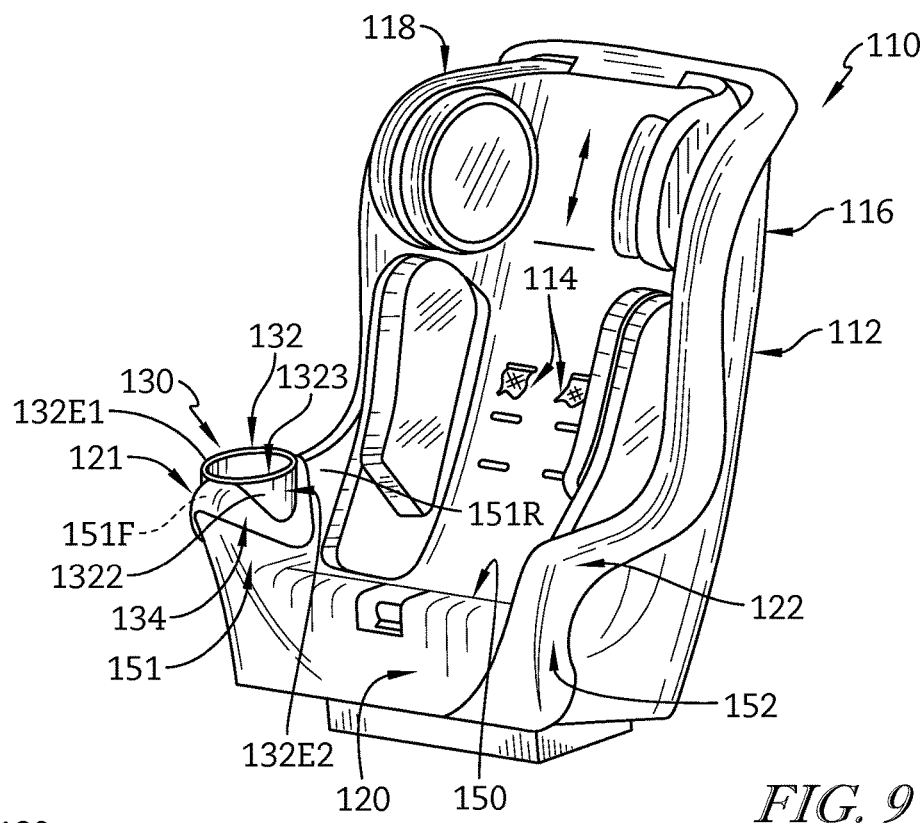
FIG. 9 is a perspective view of another child restraint including a cupholder made of an elastic deformable material in accordance with a second embodiment of the present disclosure showing a juvenile seat having first and second armrests and a seat bottom coupled to the armrests and formed to include a seat pad located between the armrests and showing that the cupholder is included in the first armrest.

Another illustrative child restraint 110 comprises a juvenile seat 112 and a child-restraint harness 114 coupled to juvenile seat 112 as shown in FIG. 9. Juvenile seat 112 includes a seat bottom 120, a seat back 116 arranged to extend upwardly from seat bottom 120, and a headrest 118 mounted for up-and-down movement on seat back 116 as suggested in FIG. 9.

Juvenile seat 112 also includes first and second armrests 121, 122 coupled to seat bottom 120 as shown, for example, in FIG. 9. In an illustrative embodiment, first armrest 121 comprises a cupholder 130 that is made of an elastic deformable material and an underlying cupholder support 140 that is made of a relatively rigid material as suggested in FIGS. 10 and 11. Cupholder 130 is overmolded onto cupholder support 140 using an overmolding process in accordance with the present disclosure in an illustrative embodiment of the present disclosure. In an illustrative embodiment shown in FIG. 9, first armrest 121 includes a cupholder while second armrest 122 does not include a cupholder.

Figure 12:
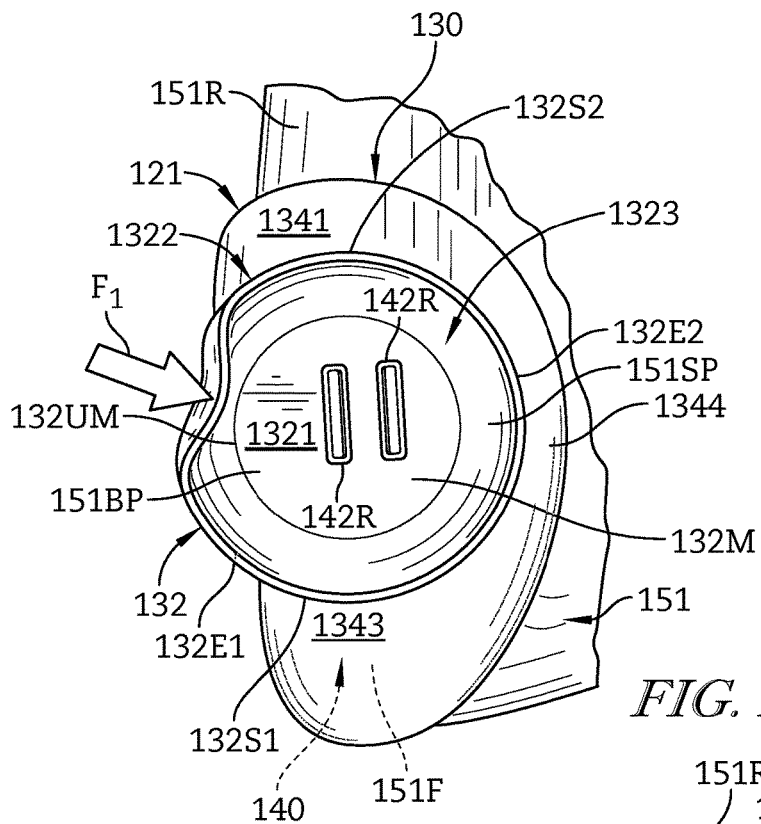
FIG. 12 is an enlarged top plan view of a portion of the child restraint of FIG. 9 showing the first armrest in a mounted position on top of the first-armrest foundation and showing elastic deformation of a round cup receiver formed in the elastic deformable cupholder in response to application of an external force to an outer portion of the cup receiver unsupported by the cupholder support.
Figure 13:
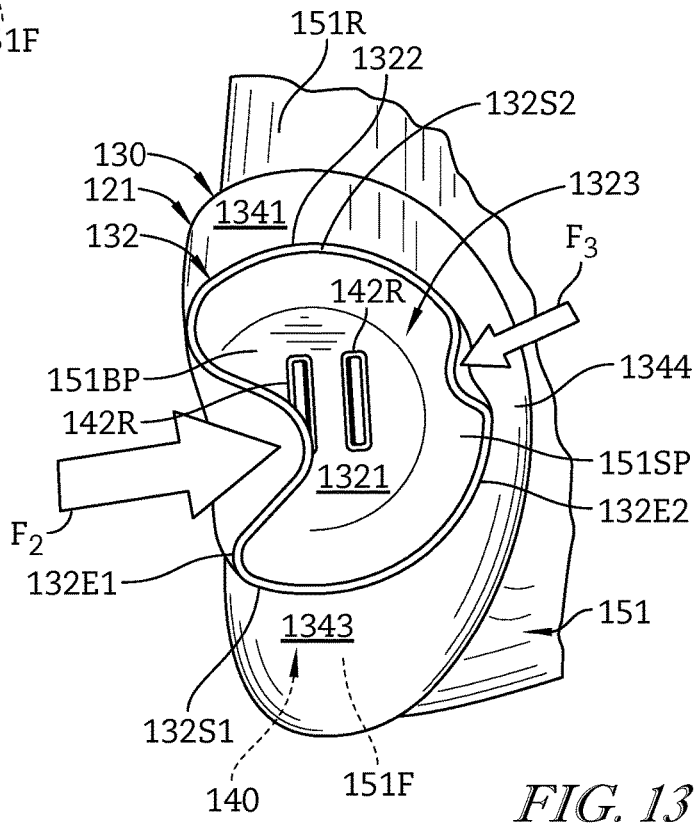
FIG. 13 is a view similar to FIG. 12 showing elastic deformation of the round cup receiver in response to another and greater external force.

Cupholder 130 includes a cup receiver 132, portions of which are configured to deform elastically when exposed to certain external impact forces $F_1$, $F_2$, and $F_3$ as shown, for example, in FIGS. 12 and 13. The portions of cup receiver 132 that are deformed when impacted move relative to cupholder support 140 as shown, for example, in FIGS. 12 and 13.

Figure 10:
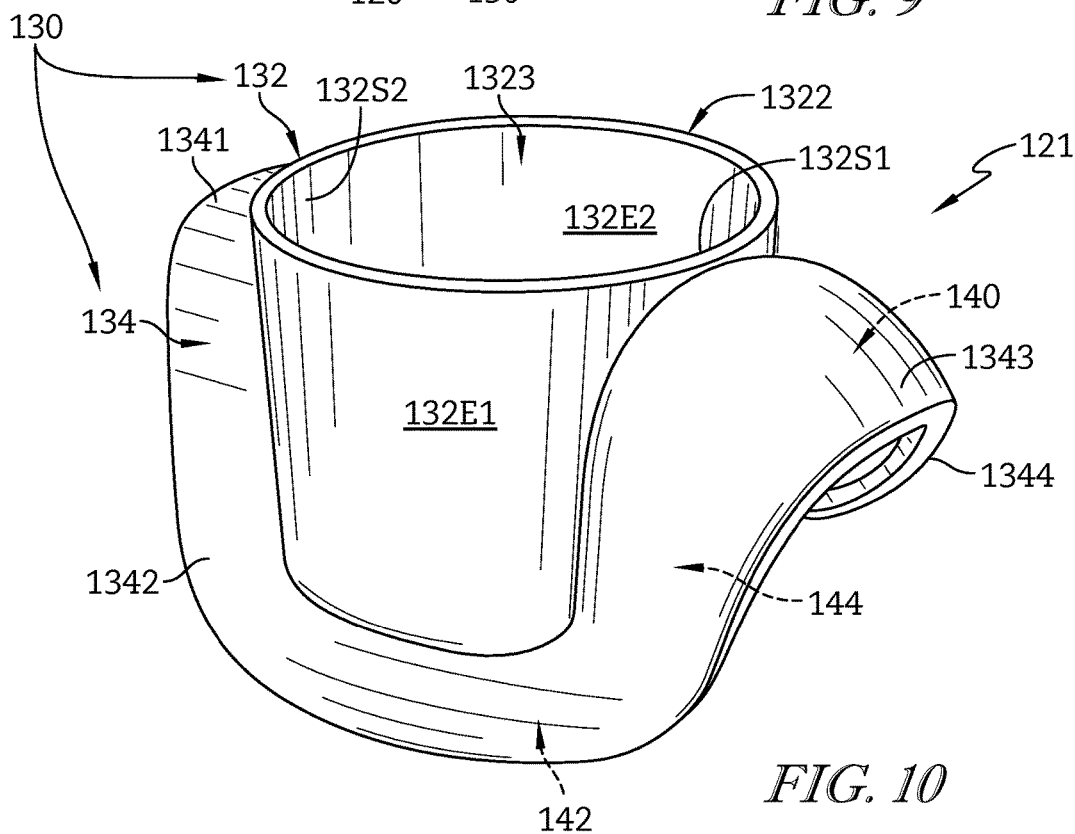
FIG. 10 is an enlarged perspective view of the first armrest of FIG. 9 before it is mounted on an underlying first-armrest foundation included in the seat bottom.
Figure 11:
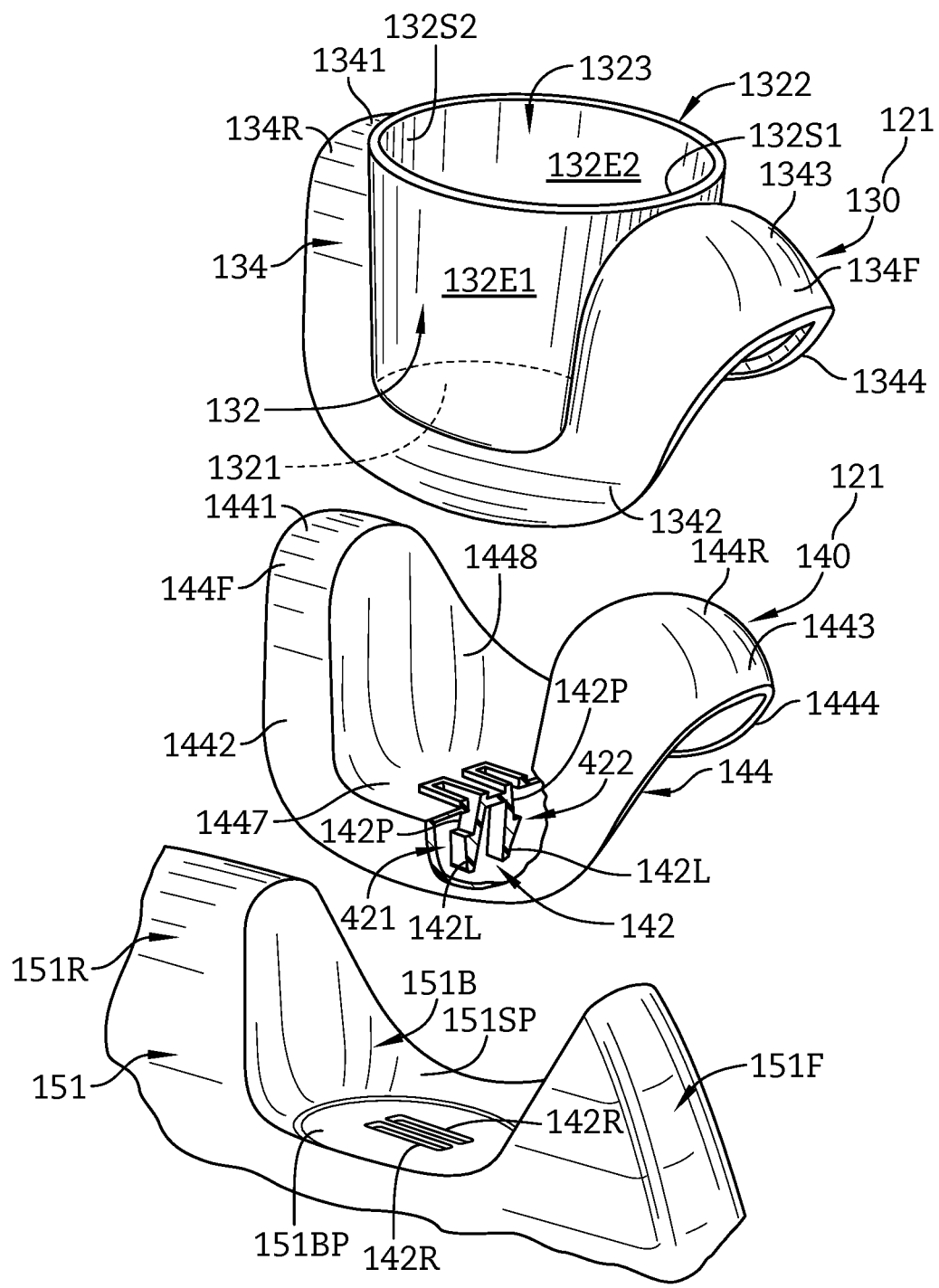
FIG. 11 is an exploded perspective assembly view showing the elastic deformable cupholder before it is mated with an underlying cupholder support to form the first armrest shown in FIG. 10 and showing the underlying first-armrest foundation included in the seat bottom.
Figure 14:
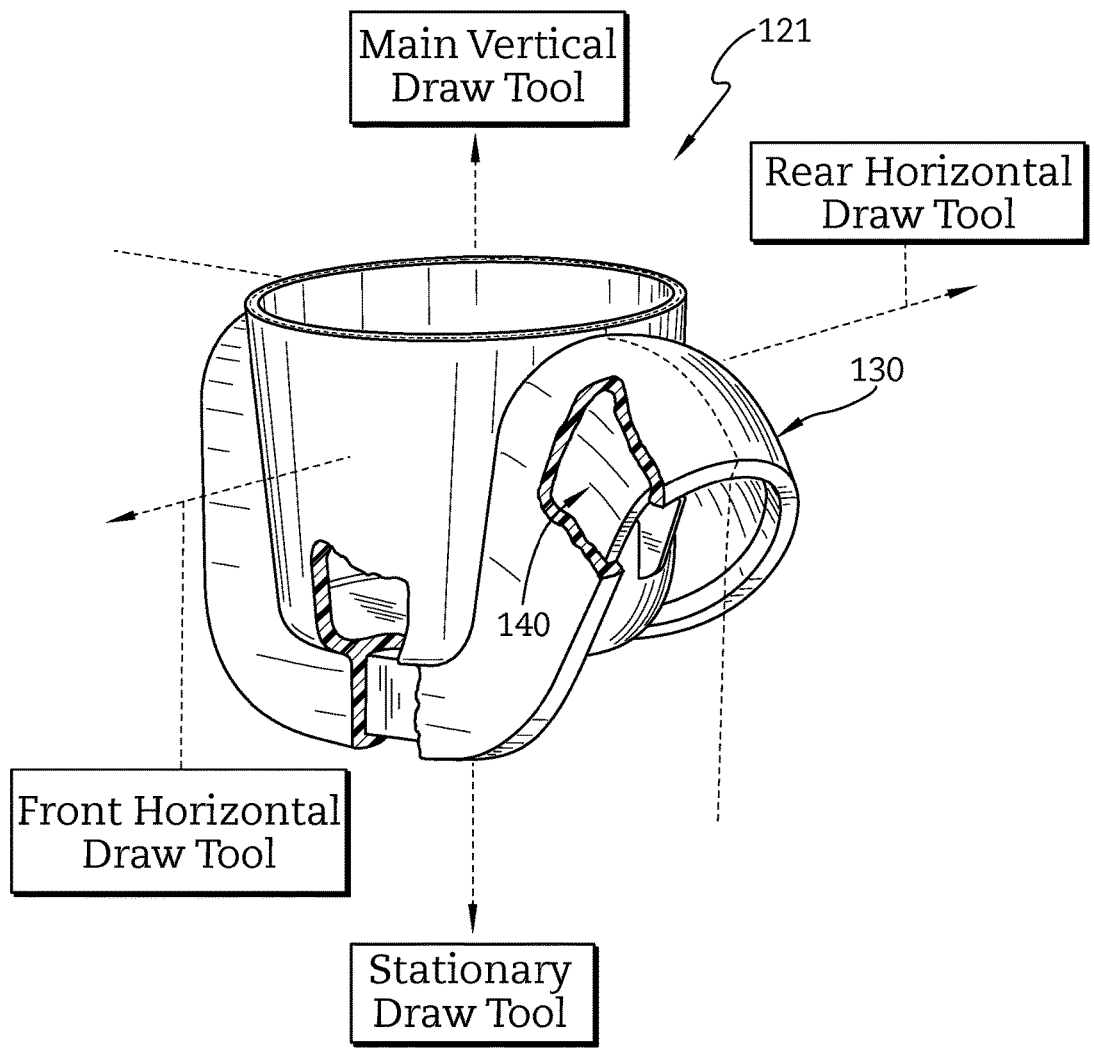
FIG. 14 is a diagrammatic view suggesting a process for overmolding the elastic deformable cupholder of FIG. 11 onto the underlying cupholder support of FIG. 11.
Figure 15:
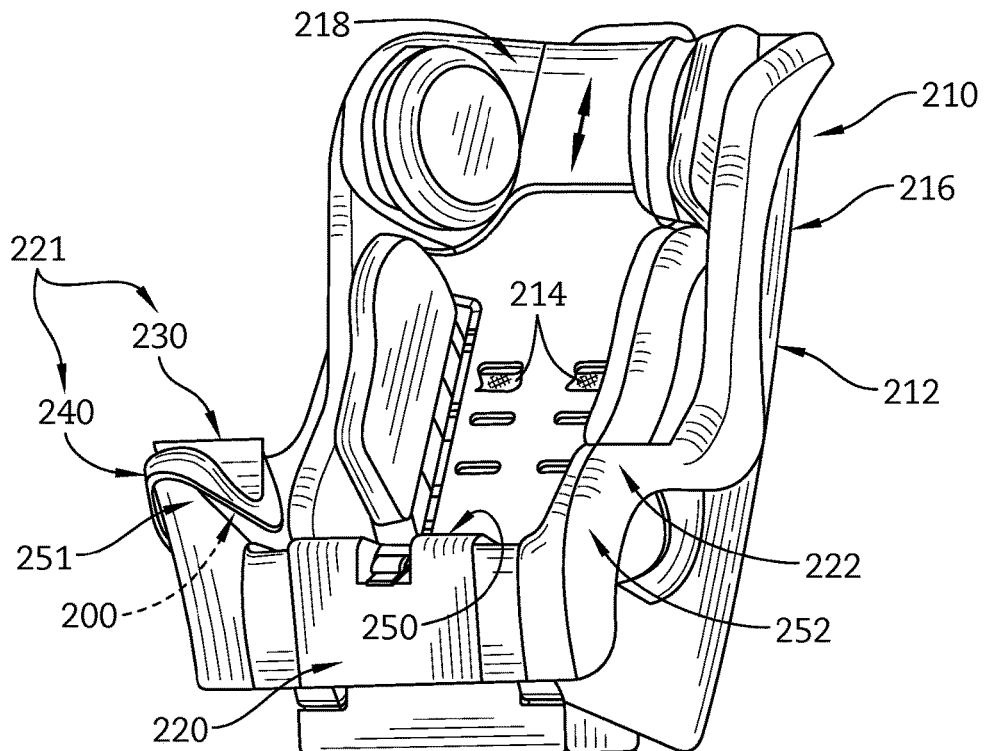
FIG. 15 is a perspective view of another child restraint including a cupholder made of an elastic deformable material in accordance with a third embodiment of the present disclosure showing a juvenile seat having first and second armrests and a seat bottom coupled to the armrests and formed to include a seat pad located between the armrests and showing that the cupholder is included in the first armrest.
Figure 16:
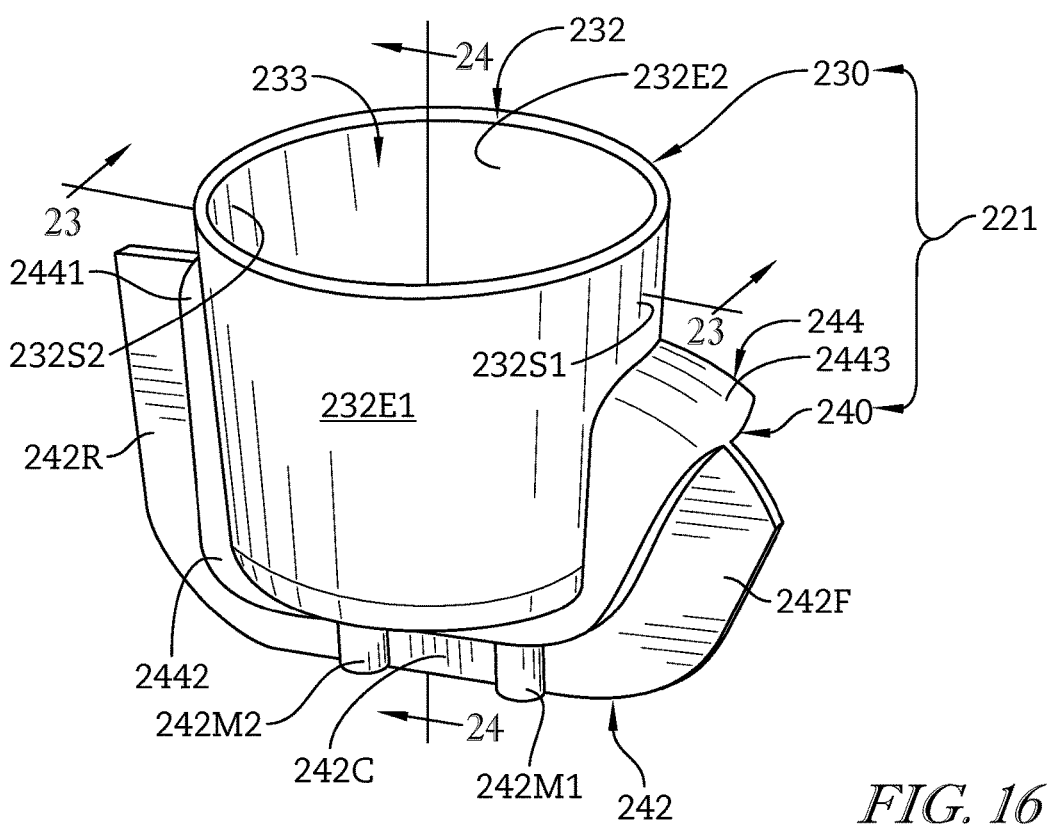
FIG. 16 is an enlarged perspective view of the first armrest of FIG. 15 defined by a cupholder carried on an underlying cupholder support before the first armrest is mounted on an underlying first-armrest foundation included in the seat bottom.

As suggested in FIG. 11, cupholder 130 can be coupled to the underlying cupholder support 140 using, for example, an overmolding process illustrated in FIGS. 14-16 to produce an illustrative first armrest 121 shown in FIG. 10. First armrest 121 is configured to be mounted on seat bottom 120 as suggested in FIGS. 9 and 11.

Seat bottom 120 includes a first-armrest foundation 151 under first armrest 121, a second-armrest foundation 152 under second armrest 122, and a seat pad 150 arranged to extend between foundations 151, 152 as shown, for example, in FIG. 9. In an illustrative embodiment, first armrest 121 is retained in a stationary position on underlying first-armrest foundation 151 to elevate cupholder 130 (and cup receiver 132) above seat bottom 120 as shown in FIG. 9. In an illustrative embodiment, second armrest 122 and second-armrest foundation 152 cooperate to form a monolithic element as suggested in FIG. 9.

An outer exterior portion 132E1 of cup receiver 132 is arranged to extend away from seat pad 150 and second armrest 122 as suggested in FIG. 9. This outer exterior portion 132E1 of cup receiver 132 can deform elastically when exposed to external impact forces $F_1$ or $F_2$ as suggested in FIGS. 12 and 13 without impairing long-term functionality of cup receiver 132.

An inner exterior portion 132E2 of cup receiver 132 is arranged to extend toward seat pad 150 and second armrest 122 as also suggested in FIG. 9. This inner exterior portion 132E2 of cup receiver 132 can deform elastically when exposed to external impact force $F_3$ as suggested in FIG. 13 without impairing long-term functionality of cup receiver 132.

Cupholder 130 includes cup receiver 132 and a receiver mount 134 appended to cup receiver 132 as shown, for example, in FIGS. 9-11. In illustrative embodiments, cupholder 130 is a monolithic component made of a deformable elastic material to provide both outer and inner exterior portions 132E1, 132E2 of cup receiver 132 with a deformable elastic quality.

Cupholder support 140 includes a base 144 and a base anchor 142 coupled to base 144 and configured to mate with first-armrest foundation 151 to retain cupholder support 140 in a stationary position on first-armrest foundation 151 of seat bottom 120 as suggested in FIGS. 9 and 11. In illustrative embodiments, base 144 is made of a substantially rigid material to support most of cupholder 130 thereon without hindering elastic deformation of outer and inner exterior portions 132E1, 132E2 during exposure to external impact forces, e.g., $F_1$, $F_2$, and $F_3$, as suggested in FIGS. 12 and 13. As suggested in FIGS. 10-13, most of cupholder 130 is mounted in a stationary position on underlying portions of cupholder support 140 during, for example, an overmolding process shown in FIGS. 14-16, to form a first armrest 121 that is configured to be mounted on the underlying first-armrest foundation 151 as suggested in FIGS. 9 and 11.

Cup receiver 132 of cupholder 130 includes a round floor 1321 and a side wall 1322 coupled to a perimeter edge of floor 1321 as shown in FIGS. 12 and 13. Side wall 1322 and floor 1321 cooperate to form a cup-receiving cavity 1323, as shown, for example, in FIGS. 9-13. As suggested in FIG. 11, mounted portions of floor 1321 and side wall 1322 of cup receiver 132 are arranged to mate with companion surfaces on base 144 of cupholder support 140 when cupholder 130 is overmolded onto cupholder support 140. Unmounted portions of floor 1321 and side wall 1322 are not mated to the relatively rigid cupholder support 140 and cooperate to define elastically deformable outer and inner exterior portions 132E1, 132E2 of cup receiver 132.

Receiver mount 134 of cupholder 130 is coupled to side wall 1322 of cup receiver 132 as suggested in FIGS. 11-13. Receiver mount 134 includes a rear top wall 1341, an outer side wall 1342, a front top wall 1343, and an inner side wall 1344 as shown, for example, in FIGS. 11-13. Outer and inner walls 1342, 1344 are substantially U-shaped in an illustrative embodiment. As suggested in FIG. 11, each of walls 1341-1344 is arranged to mate with a companion surface on base 144 of cupholder support 140 when cupholder 130 is overmounted onto cupholder support 140.

Base 144 of cupholder support 140 includes a rear top wall 1441, an outer side wall 1342, a front top wall 1443, and an inner side wall 1444 as shown, for example, in FIG. 11. Each of these walls 1441-1444 in base 144 of cupholder support 140 is arranged to mate with a companion one of the walls 1341-1344 in receiver mount 134 of cupholder 130 when cupholder 130 is mated with cupholder support 140 as suggested in FIG. 11.

Base 144 of cupholder support 140 further includes a floor-support wall 1447 and a side-support wall 1448 as suggested in FIG. 11. In illustrative embodiments, side-support wall 1448 includes a concave curved surface configured to mate with a rear mounted portion of curved side wall 1332 of cup receiver 132 and a opposite concave curved surface configured to mate with a front mounted portion of curved side wall 1332 of cup receiver 132. Also in illustrative embodiments, floor-support wall 1447 is substantially flat and configured to mate with round floor 1321 of cup receiver 132 as suggested in FIGS. 10 and 11.

Base anchor 142 of cupholder support 140 is configured to provide means for retaining base 144 of cupholder support 140 in a stationary position on first-armrest foundation 151 as suggested in FIGS. 9 and 11. In an illustrative embodiment, base anchor 142 comprises first and second support anchors 421, 422 as shown, for example, in FIG. 11. Each of support anchors 421, 422 includes a retention lug 142L and a lug-carrier post 142P as shown best in FIG. 11. An upper end of each lug-carrier post 142P is coupled to base 144 and a lower end of each lug-carrier post 142P is coupled to a companion retention lug 142L.

First-armrest foundation 151 is arranged to rise upwardly along one side of seat pad 150 as suggested in FIG. 9. First-armrest foundation 151 is formed to include a rear ridge 151R, a front ridge 151F, and a central basin 151B located between rear and front ridges 151R, 151F as suggested in FIG. 11. Central basin 151B is defined by a bottom plate 151BP arranged to underlie floor-support wall 1447 of base 144 and a side pan 151SP coupled to a perimeter edge of bottom plate 151BP and arranged to underlie side-support wall 1448 of base 144 as suggested in FIG. 11

Bottom plate 151BP is formed to include first and second anchor receivers 142R as suggested in FIG. 11. In illustrative embodiments, when base 144 of cupholder support 140 is mounted on underlying first-armrest foundation 151 to locate cup-receiver 132 in central basin 151B of first-armrest foundation 151 as suggested in FIG. 11, each of support anchors 421, 422 is inserted into a companion one of anchor receivers 142R to cause each retention lug 142L to snap into engagement with an underside portion of bottom plate 151BP bordering the companion anchor receiver 142R. In this retained position, cup receiver 132 is retained in central basin 151B between rear and front ridges 151R, 151F as suggested in FIGS. 9 and 12.

In illustrative embodiments, first armrest 121 is molded as suggested in FIG. 14. The result is that cupholder 130 is overmolded onto cupholder support 140 to produce first armrest 121.

Juvenile seat 110 includes a seat bottom 120, a cupholder support 140 coupled to seat bottom 120, and a cupholder 130 mounted on cupholder support 140 as shown in FIG. 9. Cupholder 130 includes a cup receiver 132 having a floor 1321 and a side wall 1322 arranged to cooperate with floor 1321 to form a cup-receiving cavity 1323 as shown in FIG. 10. Side wall 1322 includes a first deformable portion 132E1 that is arranged to extend away from cupholder support 140 so as to be unsupported by cupholder support 140. Side wall 1322 is configured to provide first crumple means in side wall 1322 for deforming elastically to change from an initial shape and move relative to floor 1321 to assume a different temporary shape and reduce a volume of cup-receiving cavity 1323 temporarily only during exposure of first deformable portion 132E1 to an external impact force as suggested in FIGS. 12 and 13 and for returning to the initial shape following cessation of the external impact force as suggested in FIGS. 9-11.

Cupholder 130 is a monolithic component made of a deformable elastic material to provide first deformable exterior portion 132E1 of cup receiver 132 with a deformable elastic quality. Cupholder 130 is overmolded onto cupholder support 140 to locate first deformable portion 132E1 in spaced-apart relation to cupholder 130 to free first deformable portion 132E1 to move relative to cupholder support 140 during exposure to the external impact force as suggested in FIGS. 12 and 13.

Side wall 1322 of cup receiver 132 further includes a second deformable portion 132E2 that is arranged to extend away from cupholder support 140 as suggested in FIGS. 10 and 11. Side wall 1322 is configured to provide second crumple means in side wall 1322 for deforming elastically to change from an initial shape and move relative to floor 1321 to assume a different temporary shape and reduce the volume of cup-receiving cavity 1323 temporarily only during exposure of second deformable portion 132E2 to an external impact force as suggested in FIG. 13 and for returning to the initial shape following cessation of the external impact force as suggested in FIGS. 9 and 10.

First armrest 121 is coupled to seat bottom 120 as shown in FIG. 1. Second armrest 122 is coupled to seat bottom 120 and arranged to lie in spaced-apart relation to first armrest 121 to locate a seat pad 150 included in seat bottom 120 in a position between first and second armrests 121, 122. Cupholder 130 and cupholder support 140 are included in first armrest 21 as suggested in FIG. 11. The first deformable portion 132E1 of cup receiver 132 is arranged to extend in a first direction away from seat pad 150 and second armrest 22 to lie in a space outside of a juvenile-receiving space defined between first and second armrests 21, 22. The second deformable portion 132E2 of cup receiver 132 is arranged to extend in an opposite second direction toward second armrest 22 to face toward any juvenile seated on seat pad 150 in the juvenile-receiving space. Each of the first and second deformable portions 131E1, 132E2 has a curved shape as suggested in FIGS. 10-12.

Side wall 1322 of cup receiver 132 further includes a first stationary portion 132S1 that is arranged to interconnect first and second deformable portions 132E1, 132E2 and also to abut a stationary portion of cupholder support 140 so that movement and deformation of first stationary portion 132S1 of side wall 1322 relative to cupholder support 140 is blocked during movement of one of first and second deformable portions 132E1, 132E2 relative to cupholder support 140. Side wall 1322 of cup receiver 132 further includes a second stationary portion 132S2 that is arranged to interconnect first and second deformable portions 132E1, 132E2 and lie in spaced-apart relation to first stationary portion 132S1 in a position located between first stationary portion 132S1 and seat back 116 and to abut a stationary portion of cupholder support 140 so that movement and deformation of second stationary portion 132S2 of side wall 1322 relative to cupholder support 140 is blocked during movement of one of first and second deformable portions 132E1, 132E2 relative to cupholder support 140.

Cupholder 130 and cupholder support 140 cooperate to define a first armrest 121 as shown in FIG. 1. Cupholder support 140 includes a base 144 configured to mate with and support cupholder 130 without hindering elastic deformation of first deformable portion 132E1 of cup receiver 132 relative to floor 1321 of cup receiver 132 as suggested in FIGS. 12 and 13. Cupholder support 140 further includes a base anchor 142 coupled to base 144 and configured to provide means for mating with a first-armrest foundation 151 included in seat bottom 120 during a manufacturing process to retain cupholder support 40 in a stationary position on first-armrest foundation 151.

Seat bottom 120 further includes a second-armrest foundation 152 arranged to lie in spaced-apart relation to first-armrest foundation 151 and a seat pad 150 located between first-armrest and second-armrest foundations 151, 152 as suggested in FIG. 1. Second armrest 122 is coupled to second-armrest foundation 152 to lie in spaced-apart relation to first armrest 21 defined by cupholder 130 and cupholder support 140. First-armrest foundation 151 is formed to include an upwardly opening anchor receiver 142R. Base anchor 142 included in cupholder support 140 is arranged to extend downwardly into the upwardly opening anchor receiver 142R formed in first-armrest foundation 151 to couple cupholder support 140 to seat bottom 120. Base anchor 142 is configured to provide means for retaining base 144 of cupholder support 140 in a stationary position on first-armrest foundation 151 in response to movement of cupholder support 140 to engage first-armrest foundation 151.

First-armrest foundation 151 is formed to include a rear ridge 151R, a front ridge 151F, and a central basin 151B located between rear and front ridges 151R, 151F as suggested in FIG. 11. Central basin 151B is defined by a bottom plate 151BP arranged to underlie a floor-support wall 1447 included in base 144 of cupholder support 140 and a side pan 151SP coupled to a perimeter edge of bottom plate 151B and arranged to underlie a side-support wall 1448 included in base 144 of cupholder support 140. Bottom plate 151BP is formed to include the upwardly opening anchor receiver 142R. Cup receiver 132 of cupholder 130 is located in central basin 151B when base anchor 142 of cupholder support 140 is arranged to extend into the upwardly opening anchor receiver 142R formed in bottom plate 151BP and cupholder 130 is mounted on cupholder support 140R.

Cupholder 130 further includes a saddle-shaped receiver mount 134 coupled to cup receiver 132 and formed to include a rear flange 134R lying above and covering a portion of the rear ridge 151R and a front flange 134F lying above and covering a portion of front ridge 151F as suggested in FIG. 11. Cup receiver 132 is arranged to lie in central basin 151B formed in first-armrest foundation 151 when receiver mount 134 is coupled to cupholder support 140. Rear ridge 151R is arranged to lie in a position between seat back 112 and front ridge 151F.

Cupholder support 140 is saddle-shaped and includes a front shroud 144F and a rear shroud 144R as suggested in FIG. 11. Front shroud 144F is positioned to lie between front flange 134F of receiver mount 134 of cupholder 130 and front ridge 151F of first-armrest foundation 151 and formed to include a front hollow region receiving front ridge 151F therein. Rear shroud 144R is positioned to lie between rear flange 134R of receiver mount 134 of cupholder 130 and rear ridge 151R of first-armrest foundation 151 and formed to include a rear hollow region receiving rear ridge 151R therein. Side-support wall 1448 of base 144 of cupholder support 140 is arranged to interconnect front and rear shrouds 144F, 144R and arranged to cover portions of cup receiver 132 while leaving first deformable portion 132E1 of cup receiver 132 uncovered to allow elastic deformation of first deformable portion 132E1 of cup receiver 132 during exposure of first deformable portion 132E1 of cup receiver 132 to the external impact force.

Seat bottom 120 includes a seat pad 150 arranged to lie alongside cupholder support 140, cup receiver 132 includes an outer exterior portion arranged to extend away from seat pad 150 and configured to include first deformable portion 132E1 of side wall 1322 of cup receiver 132 and an inner exterior portion arranged to extend toward seat pad 150 and configured to deform elastically when exposed to an external impact force. Cup receiver 132 is a monolithic component made of a deformable elastic material to provide both the outer and inner exterior portions of cup receiver 132 with a deformable elastic quality. Cup receiver 132 further includes a front stationary portion 132S1 arranged to interconnect the outer and inner exterior portions 132E1, 132E2 of cup receiver 132 and abut a forward portion of receiver mount 134 to lie in spaced-apart relation to seat back 12 and a rear stationary portion 132S2 arranged to interconnect the outer and inner exterior portions 132E1, 132E2 of cup receiver 134 and abut a rearward portion of receiver mount 134 to lie in a position between seat back 112 and the front stationary portion. Floor 132I of cup receiver 132 includes a mounted portion 132M arranged to lie in a stationary position on cupholder support 140 and an unmounted portion 132UM located away from cupholder support 140 and included in the outer exterior portion 132E1.

Yet another illustrative child restraint 210 comprises a juvenile seat 212 and a child-restraint harness 214 coupled to juvenile seat 212 as shown in FIG. 15. Juvenile seat 212 includes a seat bottom 220, a seat back 216 arranged to extend upwardly from seat bottom 220, an a headrest 218 mounted for up-and-down movement on seat back 216 as suggested in FIG. 15.

Juvenile seat 212 also includes first and second armrests 221, 222 coupled to seat bottom 220 as shown, for example, in FIG. 15. In an illustrative embodiment, first armrest 221 comprises a cupholder 230 that provides a cup receiver and is made of an elastic deformable material and an underlying cupholder support 240 that is made of a relatively rigid material as suggested in FIGS. 16 and 17. Exposed portions of cupholder (cup receiver) 230 are configured to deform elastically when exposed to certain external impact forces $F_1$, $F_2$, and $F_3$ as shown, for example, in FIGS. 18 and 19.

Figure 17:
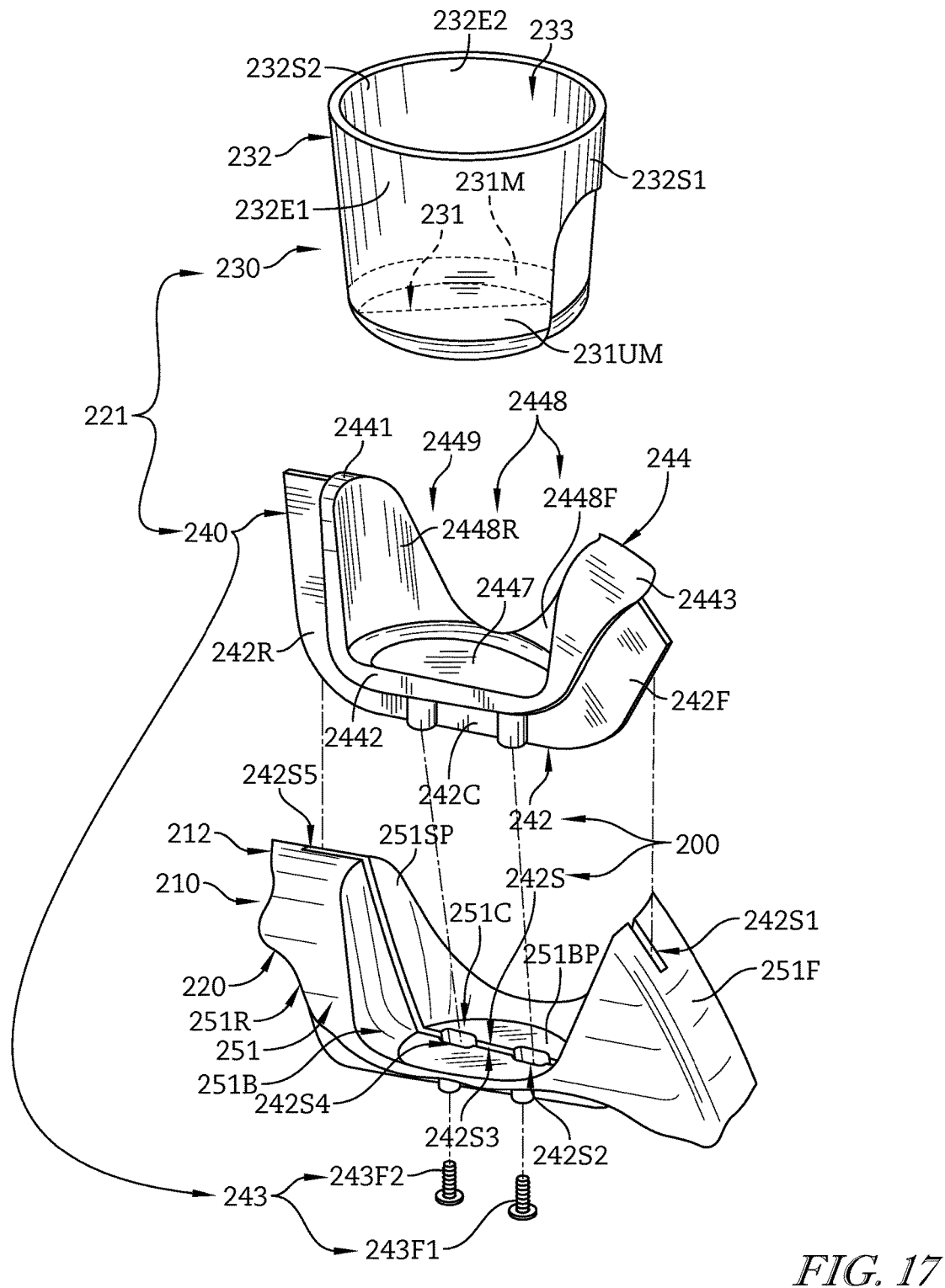
FIG. 17 is an exploded perspective diagrammatic assembly view showing the elastic deformable cupholder before it is mated with an underlying cupholder support to form the first armrest shown in FIG. 16 and showing the underlying first-armrest foundation included in the seat bottom.
Figure 23:
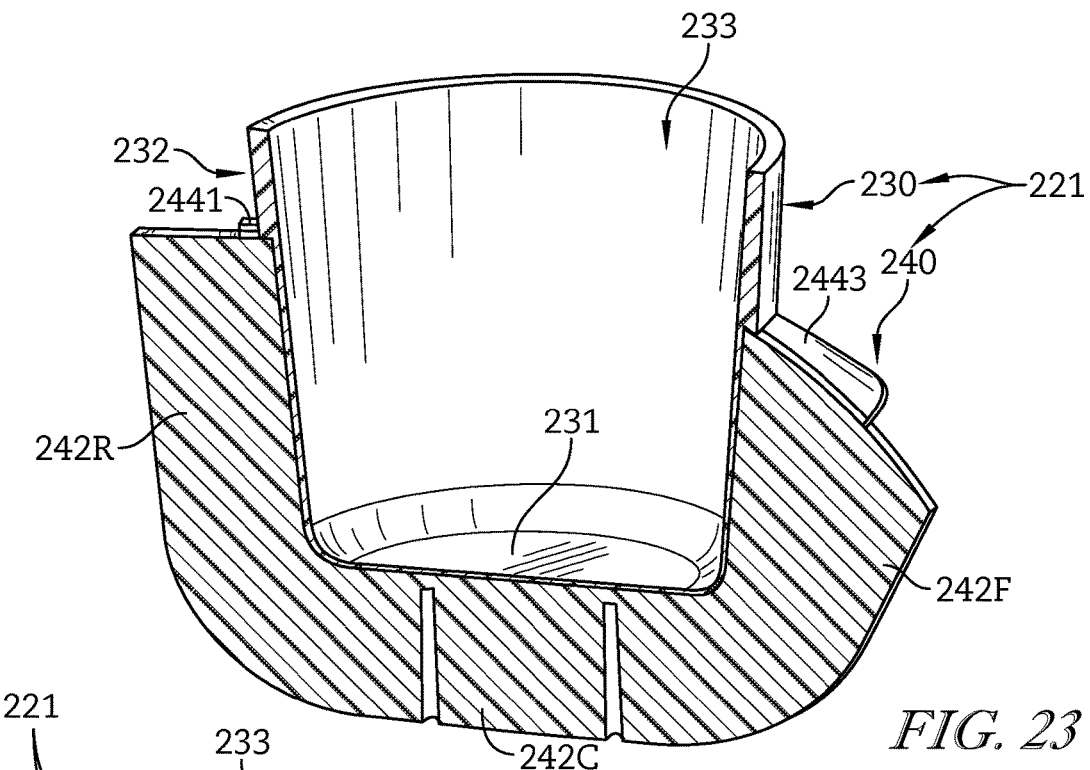
FIG. 23 is an enlarged sectional view of the first armrest taken along line 23-23 of FIG. 16 showing mating engagement of the deformable elastic cupholder and the relatively rigid underlying cupholder support.
Figure 24:
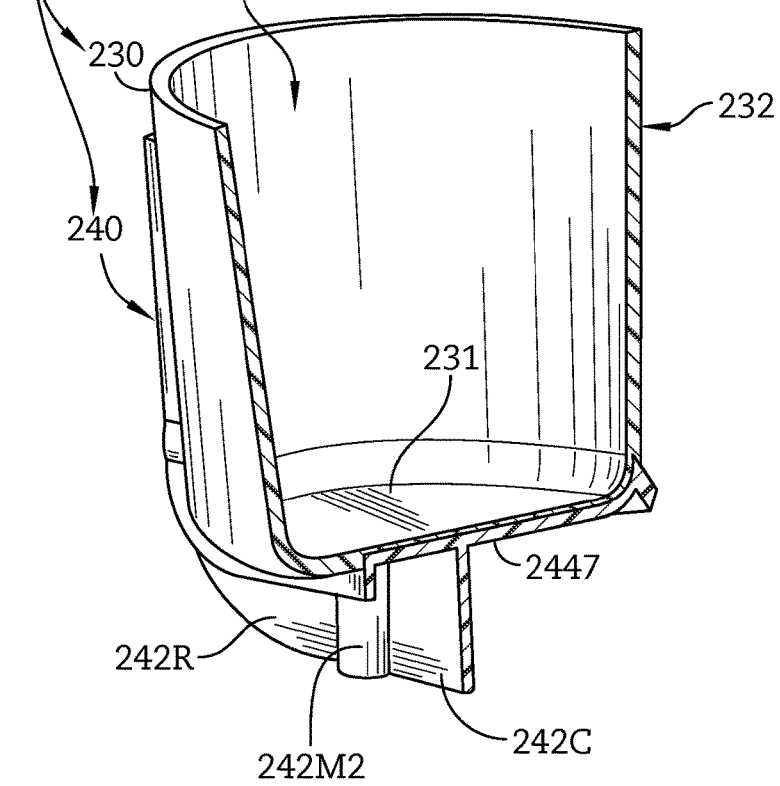
FIG. 24 is an enlarged sectional view of the first armrest taken along line 24-24 of FIG. 16 showing mating engagement of the deformable elastic cupholder and the relatively rigid underlying cupholder support.

As suggested in FIGS. 17, 23, and 24, cupholder 230 is overmolded onto cupholder support 240 to produce an illustrative first armrest 221 shown in FIG. 16 using an overmolding process. First armrest 221 is configured to be mounted on seat bottom 220 as suggested in FIGS. 15 and 17. In an illustrative embodiment shown in FIG. 15, first armrest 221 includes a cupholder while second armrest 222 does not include a cupholder.

Seat bottom 220 includes a first-armrest foundation 251 under first armrest 221, a second-armrest foundation 252 under second armrest 222, and a seat pad 250 arranged to extend between foundations 251, 252 as shown, for example, in FIG. 15. In an illustrative embodiment, first armrest 222 is retained in a stationary position on underlying first-armrest foundation 251 to elevate cupholder 230 above seat pad 250 of seat bottom 220 as shown in FIG. 15. In an illustrative embodiment, second armrest 222 and second-armrest foundation 252 cooperate to form a monolithic element as suggested in FIG. 15.

Cupholder support 240 includes a base 244, a base anchor 242, and an anchor retainer 243 as suggested in FIG. 17. In an illustrative embodiment, base 244 is saddle-shaped and adapted to mate with exterior surfaces of cupholder 230 as suggested in FIGS. 17, 21D, and 21E. In an illustrative embodiment, base anchor 242 is fin-shaped and coupled to exterior surfaces of cupholder 230 and to opposite portions of the saddle-shaped base 244 as also suggested in FIGS. 17, 21D, and 21E.

Figure 18:
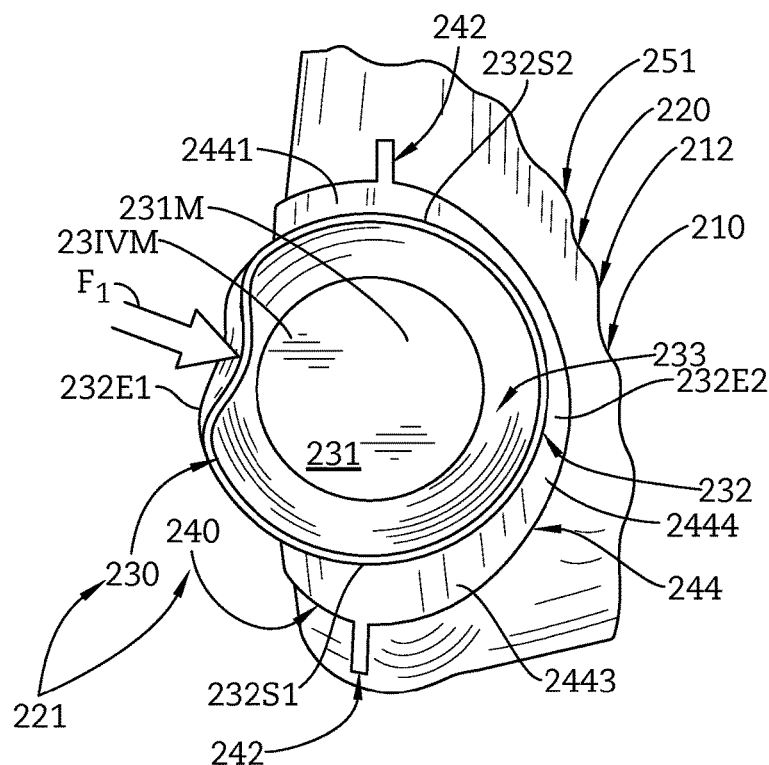
FIG. 18 is an enlarged top plan view of a portion of the child restraint of FIG. 15 showing the first armrest in a mounted position on top of the first-armrest foundation and showing elastic deformation of the elastic deformable cupholder included in the first armrest in response to application of an external force to an outer portion of the cupholder unsupported by the underlying cupholder support.
Figure 19:
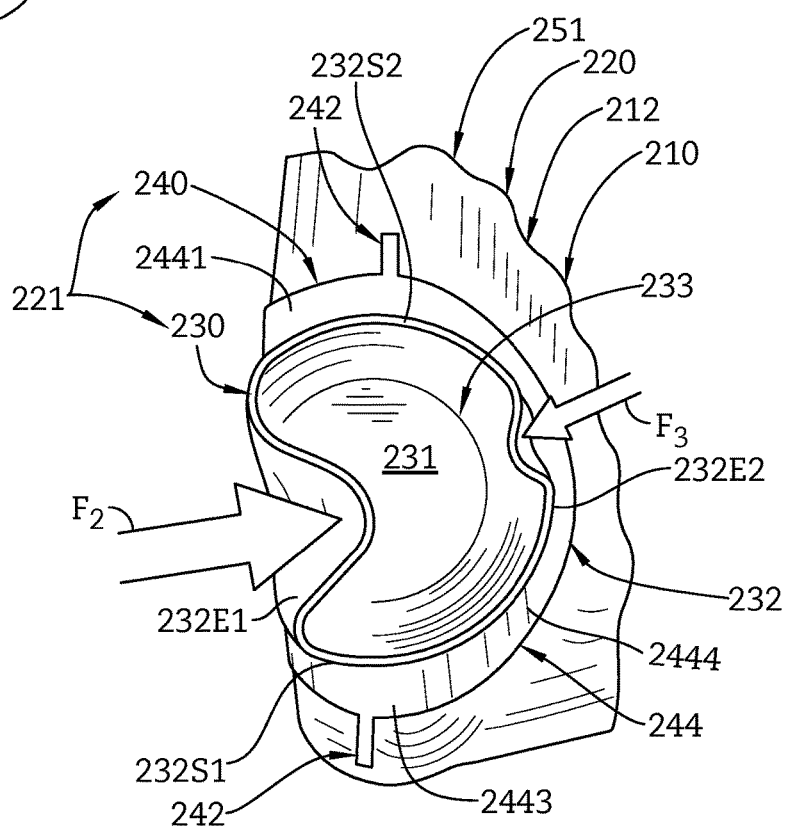
FIG. 19 is a view similar to FIG. 18 showing elastic deformation of the elastic deformable cupholder in response to external forces.

Base 244 and base anchor 242 of cupholder support 240 cooperate to form a monolithic component made of a substantially rigid plastics material in an illustrative embodiment to support cupholder 230 thereon with hindering elastic deformation of exposed portions of cupholder 230 during exposure to external impact forces, e.g., $F_1$, $F_2$, and $F_3$ as suggested in FIGS. 18 and 19. Also in an illustrative embodiment, anchor retainer 243 comprises first and second fasteners 243F1, 243F2 configured to provide means for retaining base anchor 242 in a stationary position relative to first-armrest foundation 251 of seat bottom 220 so that cupholder 230 is maintained in a stationary yet elastically deformable position on seat bottom 220 as suggested in FIGS. 15 and 17-19.

Cupholder 230 includes a round floor 231 and a side wall 232 coupled to a perimeter edge of floor 231 as shown in FIGS. 17-19, 23, and 24. Floor 231 and side wall 232 cooperate to form a cup-receiving cavity 233 as shown, for example, in FIGS. 16-19, 23, and 24. As suggested in FIGS. 21D, 21D, mounted portions of floor 231 and side wall 232 of cupholder 230 are arranged to mate with companion portions of base 244 and base anchor 242 of cupholder support 240 when cupholder 230 is overmolded onto cupholder support 240. Unmounted (e.g., exposed) portions of floor 231 and side wall 232 of cupholder 230 are not mated to the relatively rigid cupholder support 240 and remain elastically deformable as suggested in FIGS. 18 and 19.

Base 244 of cupholder support 240 includes a rear top wall 2441, an outer side wall 2442, a front top wall 2443, and an inner side wall 2444 as shown, for example, in FIGS. 17-19 and 21. Each of these walls 2441-2444 in base 244 of cupholder support 240 is arranged to mate with a companion portion of one of the floor 231 and side wall 232 of cupholder 230 when cupholder 230 is mated with cupholder support 240 as suggested in FIGS. 21A-21F.

Base 244 of cupholder 230 further includes a floor-support wall 2447 and a side-support wall 2448 as suggested in FIG. 17. In illustrative embodiments, side-support wall 2448 includes a rear concave curved surface 2448R configured to mate with a rear mounted portion of cupholder 230 and an opposite front concave curved surface 2448F configured to mate with a front mounted portion of cupholder 230. Also in illustrative embodiments, floor-support wall 2447 is substantially flat and configured to mate with round floor 231 of cupholder 230 as suggested in FIG. 17.

Base anchor 242 of cupholder support 240 and first-armrest foundation 251 cooperate to provide orientation means 200 for orienting base 244 of cupholder support 240 in a predetermined position on first-armrest foundation 251 as suggested in FIGS. 15 and 17. An upwardly opening anchor-receiving slot 242S is formed in first-armrest foundation 251 as shown, for example, in FIG. 17. Anchor-receiving slot 242S is sized to receive base anchor 242 of cupholder support 240 therein as suggested in FIGS. 17 and 20 when first armrest 221 is coupled to first-armrest foundation 251 as suggested in FIG. 15 so as to orient first armrest 221 in a predetermined orientation on first-armrest foundation 251 of seat bottom 220.

Figure 20:
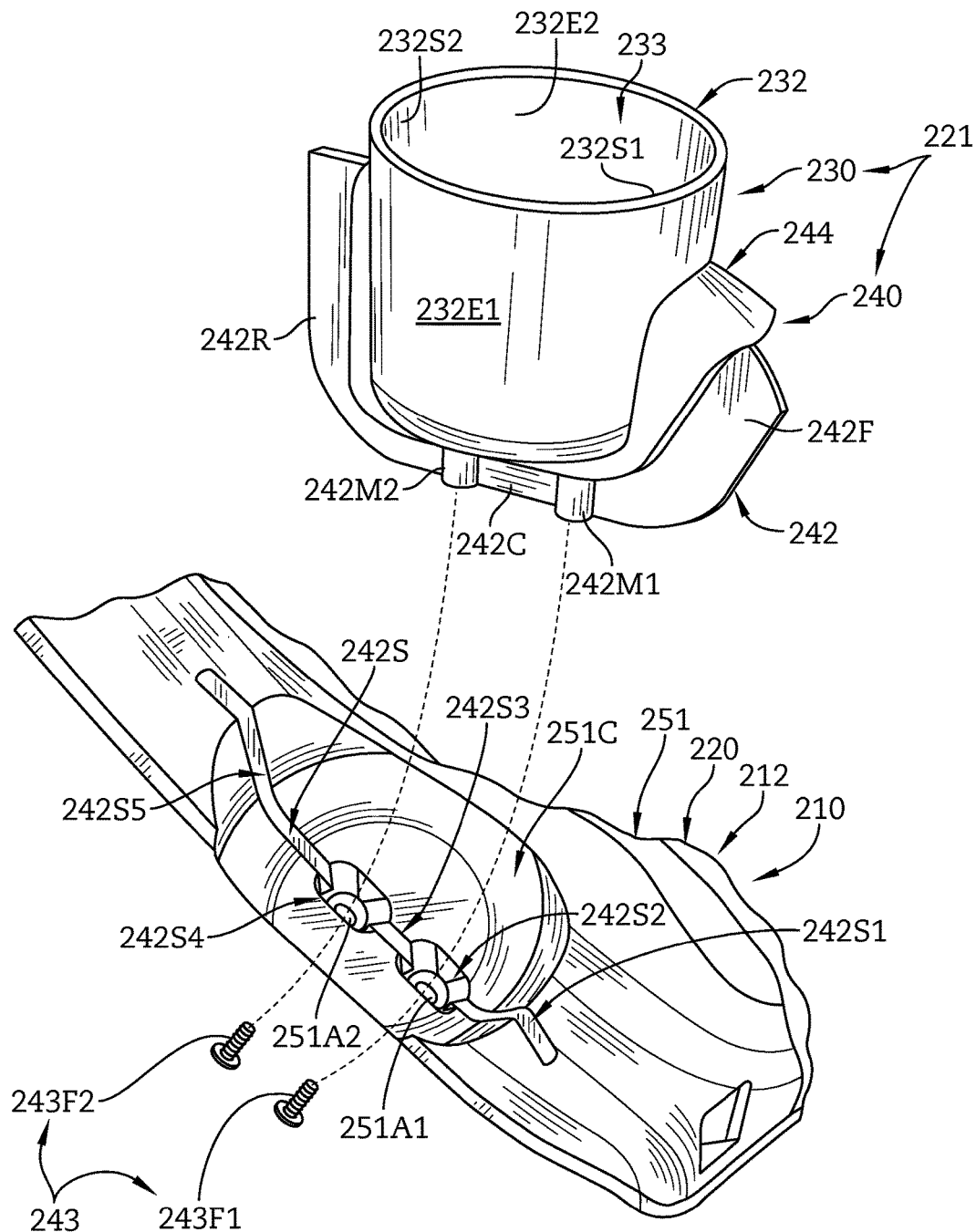
FIG. 20 is an exploded perspective assembly view showing the first armrest before it is mounted on the underlying first-armrest foundation included in the seat bottom to cause the cupholder support to mate with the first-armrest foundation and elevate the cupholder above the seat bottom as suggested in FIG. 15.
Figure 21A:
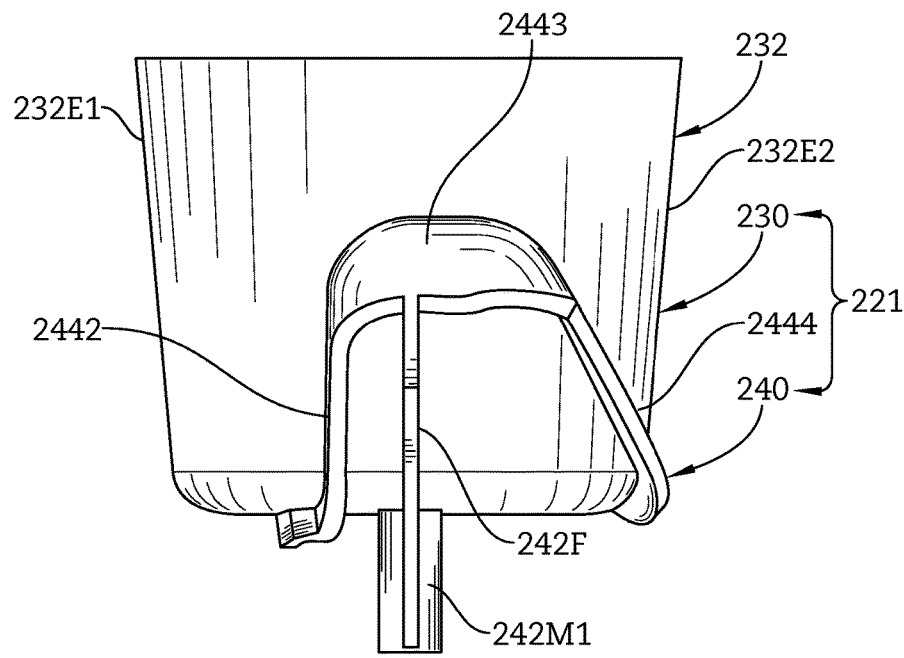
FIG. 21A is a front elevation view of the first armrest shown in FIG. 20.
Figure 21B:
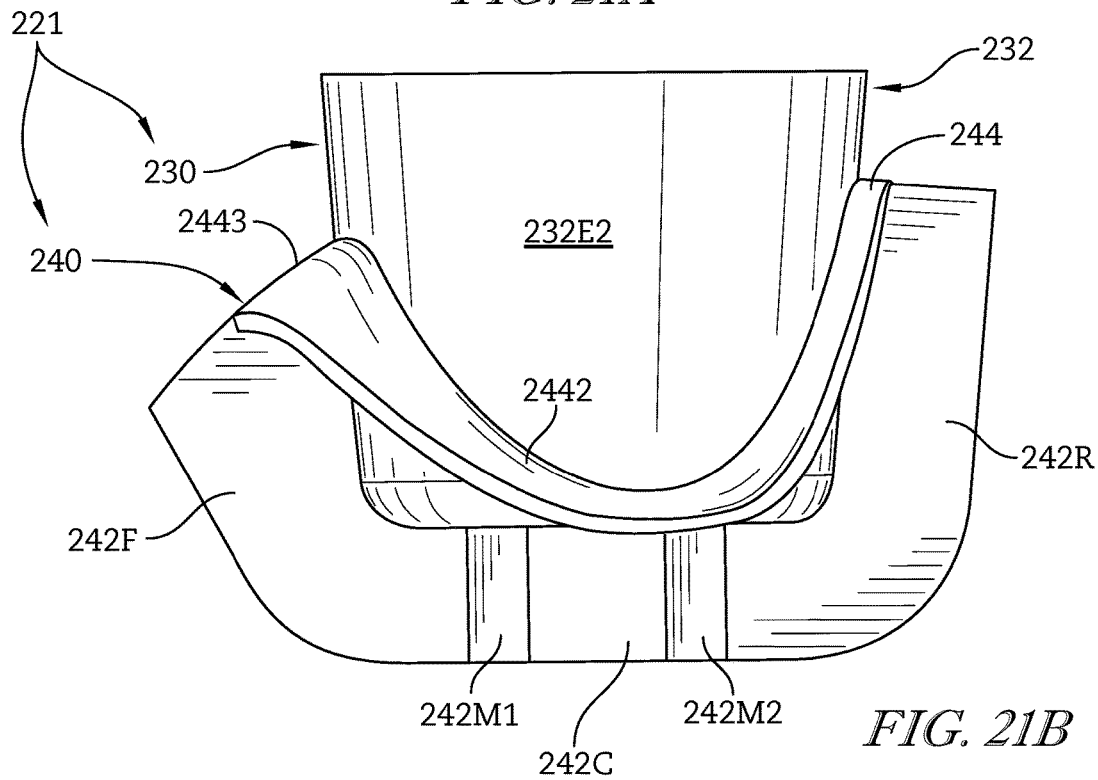
FIG. 21B is a right-side elevation view of the first armrest shown in FIG. 20.
Figure 21C:
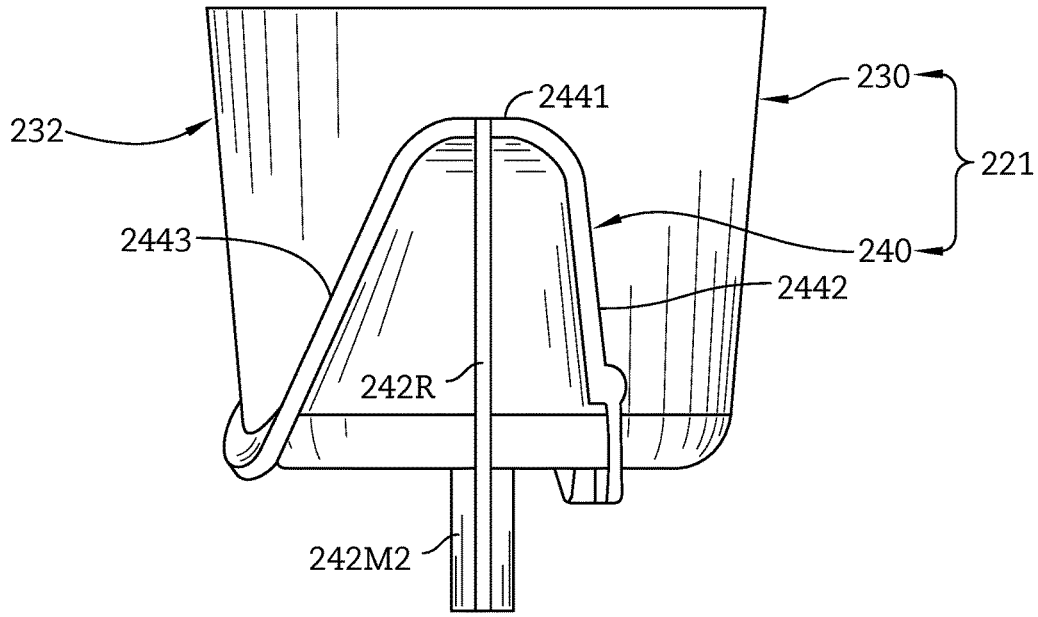
FIG. 21C is a rear elevation view of the first armrest shown in FIG. 20.
Figure 21D:
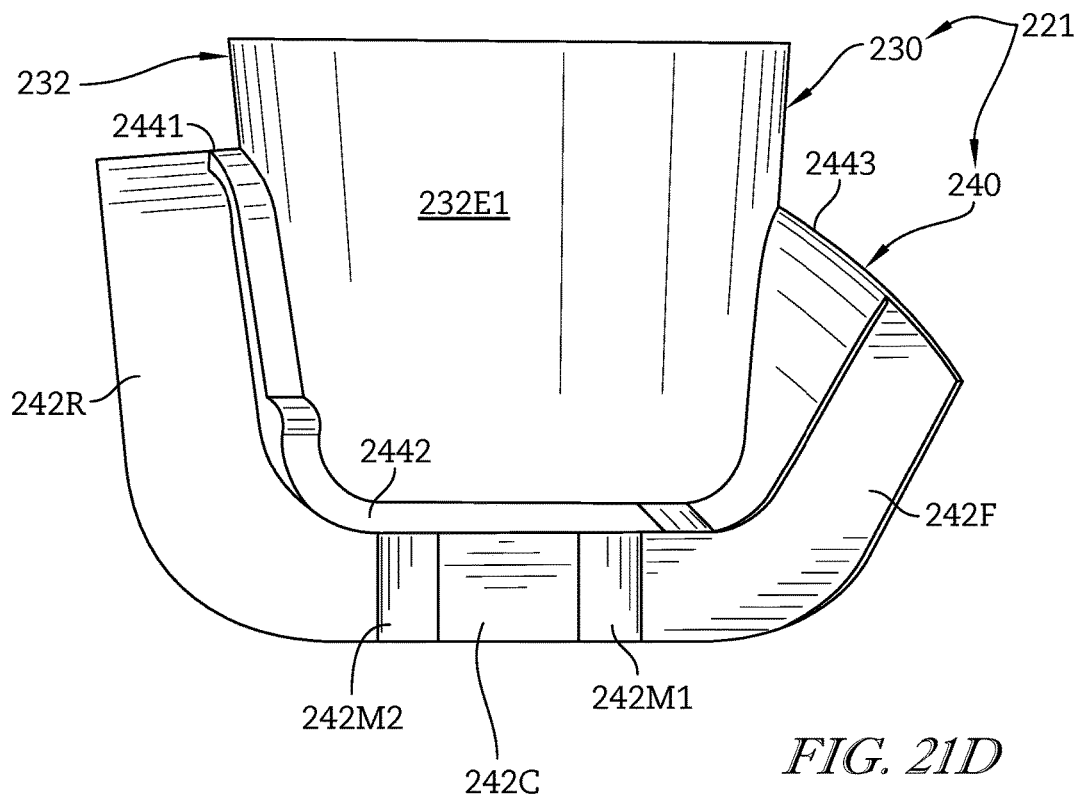
FIG. 21D is a left-side elevation view of the first armrest shown in FIG. 20.
Figure 21E:
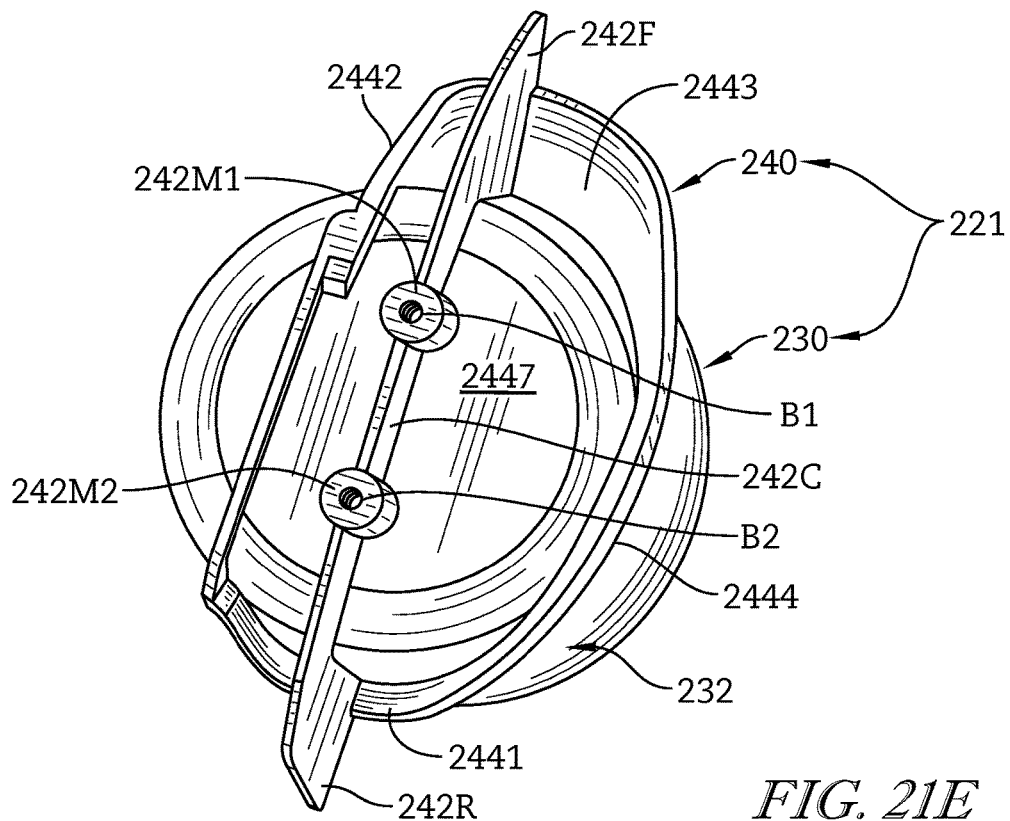
FIG. 21E is one perspective bottom view of the first armrest shown in FIG. 20.
Figure 21F:
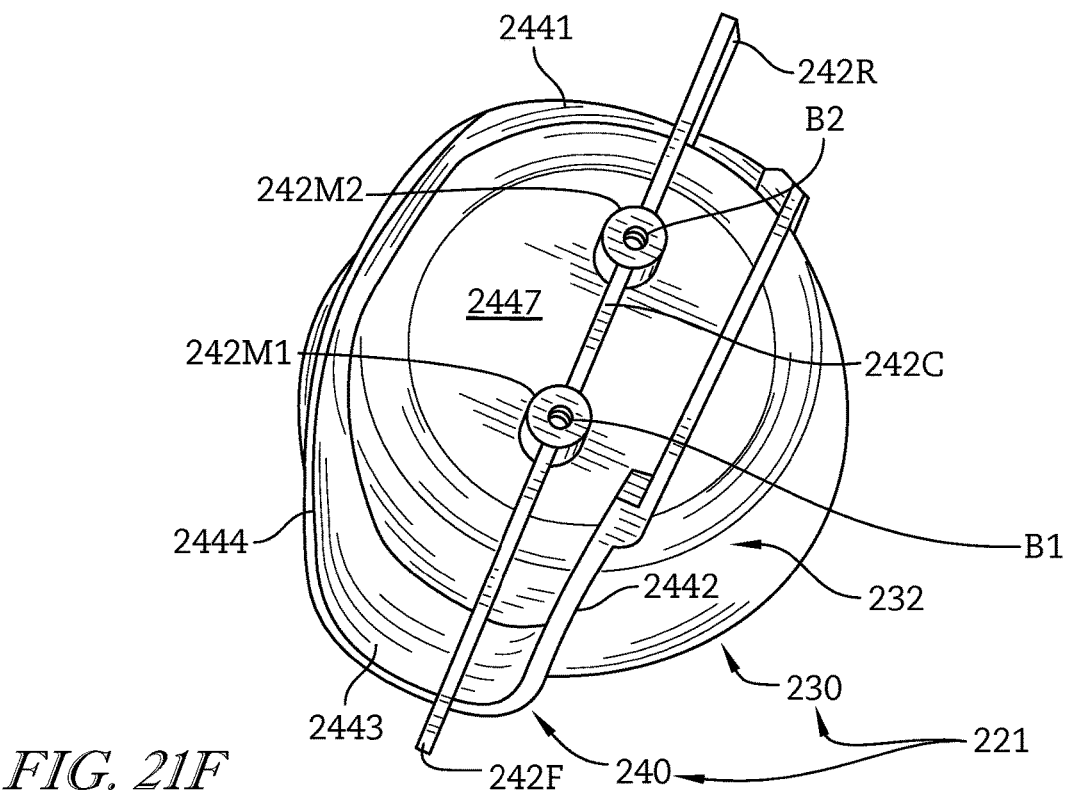
FIG. 21F is another perspective bottom view of the first armrest shown in FIG. 20.
Figure 22:
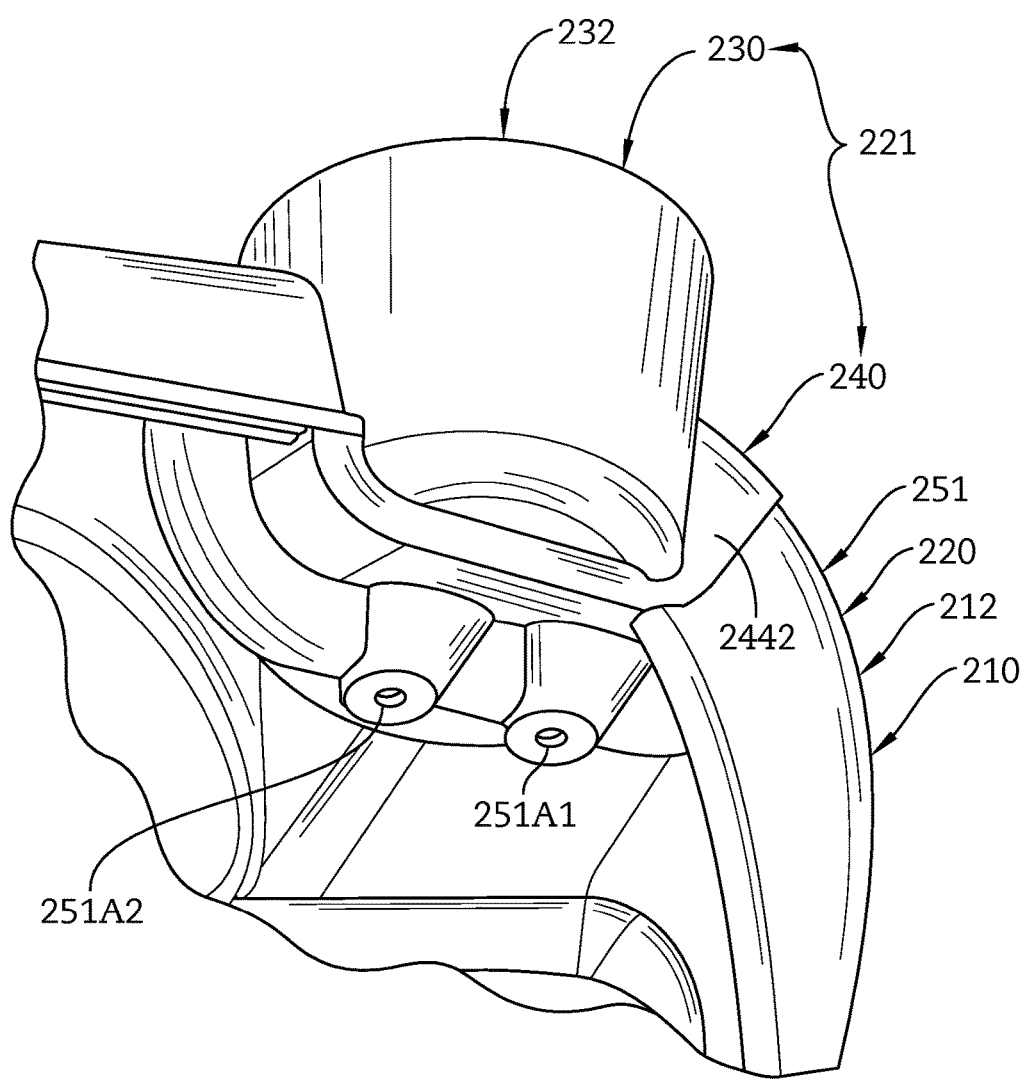
FIG. 22 is a view of a portion of the left side of the child restraint of FIG. 1 showing the elastic deformable cupholder and the underlying cupholder support that cooperate to form the first armrest mounted in a stationary position on the first-armrest foundation included in the seat bottom.

Base anchor 242 includes, in series, a front fin 242F, a front fastener mount 242M1, a center fin 242C, a rear fastener mount 242M2, and a rear fin 242R as shown, for example, in FIGS. 17 and 20. Base anchor 242 is a monolithic element in an illustrative embodiment.

Anchor-receiving slot (anchor receiver) 242S is formed to receive base anchor 242 therein as suggested in FIG. 20. Anchor-receiving slot 242S is formed to include, in series, sections 242S 1-242S5 as suggested in FIG. 20. First section 242S1 is sized to receive front fin 242F. Second section 242S2 is sized to receive first fastener mount 242M1. Third section 242S3 is sized to receive center fin 242C. Fourth section 242S4 is sized to receive second fastener mount 242M2. Fifth section 242S5 is sized to receive rear fin 242R. Each of the five sections 242S1-S5 is formed to open into a central cavity 251C formed in first-armrest foundation 251 and sized to receive portions of cupholder 230 and cupholder support 240 therein as suggested in FIG. 20.

First fastener 243F1 is sized to pass upwardly through a first aperture 251A1 communicating with second section 242S2 of anchor-receiving slot 242S as suggested in FIG. 20 to mate with first fastener mount 242M1 when first fastener mount 242M1 is located (e.g., formed) in second section 242S2 of anchor-receiving slot 242S. First fastener 243F1 also extends into a bore B1 (see FIGS. 21E and 21F) formed in first fastener mount 242M1 as suggested in FIG. 20.

Second fastener 243F2 is sized to pass upwardly through a second aperture 242A2 communicating with fourth section 242S4 of anchor-receiving slot 242S as also suggested in FIG. 20 when second fastener mount 242M2 is located (e.g., formed) in fourth section 242S of anchor-receiving slot 242S. Second fastener 243F2 also extends into a bore B2 (see FIGS. 21E and 21F) formed in second fastener mount 242M2 as suggested in FIG. 20.

First-armrest foundation 251 is arranged to rise upwardly along one side of seat pad 250 as suggested in FIG. 15. First-armrest foundation 251 is formed to include a rear ridge 251R, a front ridge 251F, and a central basin 251B located between rear and front ridges 251R, 251F as suggested in FIG. 17. Central basin 251B is defined by a bottom plate 251BP arranged to underlie floor-support wall 2447 of base 244 and a side pan 251SP coupled to a perimeter edge of bottom plate 251BP and arranged to underlie side-support wall 2448 of base 244 as suggested in FIG. 17.

Juvenile seat 210 includes a seat bottom 220, a cupholder support 240 coupled to seat bottom 220, and a cupholder 230 mounted on cupholder support 240 as shown in FIG. 15. Cupholder 230 includes a cup receiver 230 having a floor 231 and a side wall 232 arranged to cooperate with floor 231 to form a cup-receiving cavity 233 as shown in FIG. 16. Side wall 232 includes a first deformable portion 232E1 that is arranged to extend away from cupholder support 240 so as to be unsupported by cupholder support 240. Side wall 232 is configured to provide first crumple means in side wall 232 for deforming elastically to change from an initial shape and move relative to floor 231 to assume a different temporary shape and reduce a volume of cup-receiving cavity 233 temporarily only during exposure of first deformable portion 232E1 to an external impact force as suggested in FIGS. 18 and 19 and for returning to the initial shape following cessation of the external impact force as suggested in FIGS. 15 and 16.

Cupholder (cup receiver) 230 is a monolithic component made of a deformable elastic material to provide first deformable portion 232E1 of cup receiver 230 with a deformable elastic quality. Cupholder (cup receiver) 230 is overmolded onto cupholder support 240 to locate first deformable portion 231E1 in spaced-apart relation to cupholder 230 to free first deformable portion 231E1 to move relative to cupholder support 240 during exposure to the external impact force.

Side wall 232 of cup receiver 230 further includes a second deformable portion 232E2 that is arranged to extend away from cupholder support 240 as suggested in FIGS. 16-19. Side wall 232 is configured to provide second crumple means in side wall 232 for deforming elastically to change from an initial shape and move relative to floor 231 to assume a different temporary shape and reduce the volume of cup-receiving cavity 233 temporarily only during exposure of second deformable portion 232E2 to an external impact force as suggested in FIG. 19 and for returning to the initial shape following cessation of the external impact force as suggested in FIGS. 15 and 16.

First armrest 227 is coupled to seat bottom 220 as suggested in FIG. 1. Second armrest 222 is coupled to seat bottom 220 and arranged to lie in spaced-apart relation to first armrest 221 to locate a seat pad 250 included in seat bottom 220 in a position between first and second armrests 221, 222. Cupholder 230 and cupholder support 240 are included in first armrest 221. The first deformable portion 232E1 of cup receiver 230 is arranged to extend in a first direction away from seat pad 250 and second armrest 221 to lie in a space outside of a juvenile-receiving space defined between first and second armrests 221, 222. The second deformable portion 232E2 of cup receiver 230 is arranged to extend in an opposite second direction toward second armrest 222 to face toward any juvenile seated on seat pad 250 in the juvenile-receiving space. Each of the first and second deformable portions 232E1, 232E2 has a curved shape as suggested in FIGS. 16-19.

Side wall 232 of cup receiver 230 further includes a first stationary portion 232S1 that is arranged to interconnect first and second deformable portions 232E1, 232E2 and also to abut a stationary portion of cupholder support 240 so that movement and deformation of the first stationary portion 232S1 of side wall 231 relative to cupholder support 240 is blocked during movement of one of the first and second deformable portions 232E1, 232E2 relative to cupholder support 240 as suggested in FIGS. 18 and 19. Side wall 232 of cup receiver 230 her includes a second stationary portion 232S2 that is arranged to interconnect the first and second deformable portions 232E1, 232E2 and lie in spaced-apart relation to first stationary portion 232S1 in a position located between first stationary portion 232S1 and seat back 212 to abut a stationary portion of cupholder support 240 so that movement and deformation of second stationary portion 232S2 of side wall 232 relative to cupholder support 240 is blocked during movement of one of the first and second deformable portions 232E1, 232E2 relative to cupholder support 240 as suggested in FIGS. 18 and 19.

Cupholder 230 and cupholder support 240 cooperate to define a first armrest 221 as suggested in FIGS. 15 and 16. Cupholder support 240 includes a base 244 configured to mate with and support cupholder 240 without hindering elastic deformation of first deformable portion 232E1 of cup receiver 230 relative to floor 231 of cup receiver 230. Cupholder support 240 further includes a base anchor 242 coupled to base 244 and configured to provide means for mating with a first-armrest foundation 251 included in seat bottom 220 during a manufacturing process to retain cupholder support 240 in a stationary position on first-armrest foundation 251.

Seat bottom 220 further includes a second-armrest foundation 252 arranged to lie in spaced-apart relation to first-armrest foundation 251 and a seat pad 250 located between first-armrest and second-armrest foundations 251, 252 as suggested in FIG. 15. Second armrest 222 is coupled to second-armrest foundation 251 to lie in spaced-apart relation to first armrest 221 defined by cupholder 230 and cupholder support 240. First-armrest foundation 251 is formed to include an upwardly opening anchor receiver 242S. Base anchor 242 included in cupholder support 240 is arranged to extend downwardly into the upwardly opening anchor receiver 242S formed in first-armrest foundation 251 to couple cupholder support 240 to the seat bottom 220.

Cupholder support 240 further includes an anchor retainer 243 arranged to extend upwardly through an aperture formed in first-armrest foundation 251 to mate with base anchor 240 as suggested in FIG. 17. Anchor retainer 243 provides means for retaining base 244 of cupholder support 240 in a stationary position on first-armrest foundation 251 in response to movement of cupholder support 240 to engage first-armrest foundation 251.

Cupholder support 40 includes a floor-support wall 2447 and a side-support wall 2448 arranged to extend upwardly from floor-support wall 2447 as suggested in FIG. 17. Side-support wall 2448 cooperates with floor-support wall 2447 to form a support cavity 2449 receiving an inner section of cup receiver 230 to cause an outer section of cup receiver 230 including the first deformable portion of side wall 232 of cup receiver 230 to lie outside support cavity 2449 to free first deformable portion 232E1 to move relative to cupholder support 1240 during exposure to the external impact force as suggested in FIGS. 16 and 17.

Floor 231 of cup receiver 230 includes a mounted portion 231M arranged to lie in a stationary position on floor-support wall 2447 of cupholder support 240 and an unmounted portion 231UM coupled to first deformable portion 232E2 of side wall 232 of cup receiver 230 and arranged to extend away from cupholder support 240 to lie outside of support cavity 2449 formed in cupholder support 240 as suggested in FIGS. 16-19. Each of mounted and unmounted portions 231M, 231UM of floor 231 of cup receiver 230 is a D-shaped half-round segment and those D-shaped half-round segments mate in back-to-back relation to provide floor 231 with a round shape.

Seat bottom 220 includes a seat pad 250 arranged to lie alongside the cupholder support 240 as suggested in FIG. 15. Cup receiver 230 includes an outer exterior portion arranged to extend away from seat pad 250 and configured to include first deformable portion 232E1 of side wall 232 of cup receiver 230 and an inner exterior portion arranged to extend toward seat pad 250 and configured to deform elastically when exposed to an external impact force. Cup receiver 230 is a monolithic component made of a deformable elastic material to provide both the outer and inner exterior portions 232E1, 232E2 of cup receiver 230 with a deformable elastic quality. Cup receiver 230 further includes a front stationary portion arranged to interconnect the outer and inner exterior portions of cup receiver 230 and abut a forward portion of cupholder 240 to lie in spaced-apart relation to seat back 212 and a rear stationary portion arranged to interconnect the outer and inner exterior portions of the cup receiver and abut a rearward portion of cupholder 240 to lie in a position between seat back 212 and the front stationary portion.

Cupholder support 240 includes a base 244, a base anchor 242, and an anchor retainer 243 coupled to seat bottom 220 and to base 244 as suggested in FIG. 17. Base 244 is saddle-shaped and is coupled to cupholder 230. Base anchor 243 is fin-shaped and coupled to exterior surfaces of cup receiver 230 and to opposite portions of saddle-shaped base 244. Base anchor 242 includes a front fin 242F coupled to the front wall portion of base 244, a rear fin 242R coupled to the rear wall portion of base 244, and a center fin 242C arranged to lie between front and rear fins 242F, 242R and coupled to floor-support wall 2447 of base 244.

Base 244 and base anchor 242 cooperate to form a monolithic component made of a substantially rigid plastics material and configured to support cup receiver 230 thereon without hindering elastic deformation of the first deformable portion of cup receiver 232. Anchor retainer 243 is configured to provide means extending through apertures formed in seat bottom 220 and base anchor 242 for retaining base anchor 242 in a stationary position in an anchor-receiving slot 242S formed in seat bottom 220 so that cup receiver 230 is maintained in a stationary yet elastically deformable position on seat bottom 220.

Base 244 includes a floor-support wall 2447 arranged to mate with floor 231 of cup receiver 230 and a side-support wall 2448 arranged to mate with portions of side wall 232 of cup receiver 230 without contacting the first deformable portion of cup receiver 230. Side-support wall 2448 includes a front wall portion formed to include a front concave surface mating with side wall 232 of cup receiver 230 and coupled to base anchor 242 and a rear wall portion located between seat back 212 and the front portion and formed to include a rear concave surface mating with side wall 232 of the cup receiver 230 and coupled to base anchor 242.

The invention claimed is:

1. A juvenile seat comprising
a seat bottom,
a cupholder support coupled to the seat bottom, and
a cupholder mounted on the cupholder support, the cupholder including a cup receiver having a floor and a side wall arranged to cooperate with the floor to form a cup-receiving cavity, wherein the side wall includes a first deformable portion that is arranged to extend away from the cupholder support so as to be unsupported by the cupholder support and is configured to deform elastically to change from an initial shape and move relative to the floor to assume a different temporary shape and reduce a volume of the cup-receiving cavity temporarily only during exposure of the first deformable portion to an external impact force and for returning to the initial shape following cessation of the external impact force,
wherein the cupholder and cupholder support cooperate to define a first armrest, the cupholder support includes a base configured to mate with and support the cupholder without hindering elastic deformation of the first deformable portion of the cup receiver relative to the floor of the cup receiver, and the cupholder support further includes a base anchor coupled to the base and configured to mate with a first-armrest foundation included in the seat bottom during a manufacturing process to retain the cupholder support in a stationary position on the first-armrest foundation, further comprising a second armrest and wherein the seat bottom further includes a second-armrest foundation arranged to lie in spaced-apart relation to the first-armrest foundation and a seat pad located between the first-armrest and second-armrest foundations, the second armrest is coupled to the second-armrest foundation to lie in spaced-apart relation to the first armrest defined by the cupholder and the cupholder support, the first-armrest foundation is formed to include an upwardly opening anchor receiver, and the base anchor included in the cupholder support is arranged to extend downwardly into the upwardly opening anchor receiver formed in the first-armrest foundation to couple the cupholder support to the seat bottom, wherein the first-armrest foundation is formed to include a rear ridge, a front ridge, and a central basin located between the rear and front ridges, the central basin is defined by a bottom plate arranged to underlie a floor-support wall included in the base of the cupholder support and a side pan coupled to a perimeter edge of the bottom plate and arranged to underlie a side-support wall included in the base of the cupholder support, the bottom plate is formed to include the upwardly opening anchor receiver, and the cup receiver of the cupholder is located in the central basin when the base anchor of the cupholder support is arranged to extend into the upwardly opening anchor receiver formed in the bottom plate and the cupholder is mounted on the cupholder support.

2. The juvenile seat of claim 1, wherein the cupholder further includes a saddle-shaped receiver mount coupled to the cup receiver and formed to include a rear flange lying above and covering a portion of the rear ridge and a front flange lying above and covering a portion of the front ridge and the cup receiver is arranged to lie in the central basin formed in the first-armrest foundation when the receiver mount is coupled to the cupholder support.

3. The juvenile seat of claim 2, wherein the cupholder support is saddle-shaped and includes a front shroud positioned to lie between the front flange of the receiver mount of the cupholder and the front ridge of the first-armrest foundation and formed to include a front hollow region receiving the front ridge therein, a rear shroud positioned to lie between the rear flange of the receiver mount of the cupholder and the rear ridge of the first-armrest foundation and formed to include a rear hollow region receiving the rear ridge therein, and the side-support wall of the base of the cupholder support is arranged to interconnect the front and rear shrouds and arranged to cover portions of the cup receiver while leaving the first deformable portion of the cup receiver uncovered to allow elastic deformation of the first deformable portion of the cup receiver during exposure of the first deformable portion of the cup receiver to the external impact force.

4. A juvenile seat comprising
a seat bottom,
a cupholder support coupled to the seat bottom, and
a cupholder mounted on the cupholder support, the cupholder including a cup receiver having a floor and a side wall arranged to cooperate with the floor to form a cup-receiving cavity, wherein the side wall includes a first deformable portion that is arranged to extend away from the cupholder support so as to be unsupported by the cupholder support and is configured to deform elastically to change from an initial shape and move relative to the floor to assume a different temporary shape and reduce a volume of the cup-receiving cavity temporarily only during exposure of the first deformable portion to an external impact force and for returning to the initial shape following cessation of the external impact force, wherein the seat bottom includes a seat pad arranged to lie alongside the cupholder support, the cup receiver includes an outer exterior portion arranged to extend away from the seat pad and configured to include the first deformable portion of the side wall of the cup receiver and an inner exterior portion arranged to extend toward the seat pad and configured to deform elastically when exposed to an external impact force, and further comprising a seat back extending upwardly from the seat bottom and wherein the cupholder further includes a receiver mount coupled to the cupholder support and the cup receiver further includes a front stationary portion arranged to interconnect the outer and inner exterior portions of the cup receiver and abut a forward portion of the receiver mount to lie in spaced-apart relation to the seat back and a rear stationary portion arranged to interconnect the outer and inner exterior portions of the cup receiver and abut a rearward portion of the receiver mount to lie in a position between the seat back and the front stationary portion.

5. A juvenile seat comprising
a seat bottom,
a cupholder support coupled to the seat bottom, and
a cupholder mounted on the cupholder support, the cupholder including a cup receiver having a floor and a side wall arranged to cooperate with the floor to form a cup-receiving cavity, wherein the side wall includes a first deformable portion that is arranged to extend away from the cupholder support so as to be unsupported by the cupholder support and is configured to deform elastically to change from an initial shape and move relative to the floor to assume a different temporary shape and reduce a volume of the cup-receiving cavity temporarily only during exposure of the first deformable portion to an external impact force and for returning to the initial shape following cessation of the external impact force, wherein the seat bottom includes a seat pad arranged to lie alongside the cupholder support, the cup receiver includes an outer exterior portion arranged to extend away from the seat pad and configured to include the first deformable portion of the side wall of the cup receiver and an inner exterior portion arranged to extend toward the seat pad and configured to deform elastically when exposed to an external impact force, and wherein the seat bottom is formed to include a rear ridge, a front ridge, and a central basin located between the rear and front ridges and the cup receiver of the cupholder is located in the central basin.

6. The juvenile seat of claim 5, further comprising a seat back extending upwardly from the seat bottom and the rear ridge is arranged to lie in a position between the seat back and the front ridge.

7. The juvenile seat of claim 6, wherein the cupholder further includes a saddle-shaped receiver mount coupled to the cup receiver and formed to include a rear flange lying above and covering a portion of the rear ridge and a front flange lying above and covering a portion of the front ridge and the cup receiver is arranged to lie in the central basin when the receiver mount is coupled to the cupholder support.

8. The juvenile seat of claim 7, wherein the cupholder support is saddle-shaped and includes a front shroud positioned to lie between the front flange of the receiver mount of the cupholder and the front ridge and formed to include a front hollow region receiving the front ridge therein and a rear shroud positioned to lie between the rear flange of the receiver mount of the cupholder and the rear ridge and formed to include a rear hollow region receiving the rear ridge therein, and a side-support wall of the cupholder support is arranged to interconnect the front and rear shrouds and arranged to cover portions of the cup receiver while leaving the first deformable portion of the cup receiver uncovered to allow elastic deformation of the first deformable portion of the cup receiver during exposure of the first deformable portion of the cup receiver to the external impact force.

9. A juvenile seat comprising
a seat bottom,
a cupholder support coupled to the seat bottom, and
a cupholder mounted on the cupholder support, the cupholder including a cup receiver having a floor and a side wall arranged to cooperate with the floor to form a cup-receiving cavity, wherein the side wall includes a first deformable portion that is arranged to extend away from the cupholder support and to deform from an initial shape and move relative to the floor to assume a different temporary shape and reduce a volume of the cup-receiving cavity during exposure of the first deformable portion to an external impact force,
wherein the cupholder support includes a base configured to mate with and support the cupholder without hindering elastic deformation of the first deformable portion of the cup receiver relative to the floor of the cup receiver and the cupholder support further includes a base anchor coupled to the base and configured to mate with a foundation included in the seat bottom to retain the cupholder support in a stationary position on the foundation,
wherein the seat bottom further includes another foundation arranged to lie in spaced-apart relation to the other foundation and a seat pad located between the foundations, one of the foundations is formed to include an anchor receiver, and the base anchor included in the cupholder support is arranged to extend into the anchor receiver formed in the foundation to couple the cupholder support to the seat bottom,
wherein the foundation is formed to include a rear ridge, a front ridge, and a central basin located between the rear and front ridges and the central basin is defined by a bottom plate arranged to underlie a floor-support wall included in the base of the cupholder support and a side pan coupled to a perimeter edge of the bottom plate and arranged to underlie a side-support wall included in the base of the cupholder support.

10. A juvenile seat comprising
a seat bottom,
a cupholder support coupled to the seat bottom, and
a cupholder mounted on the cupholder support, the cupholder including a cup receiver having a floor and a side wall arranged to cooperate with the floor to form a cup-receiving cavity, wherein the side wall includes a first deformable portion that is arranged to extend away from the cupholder support and to deform from an initial shape and move relative to the floor to assume a different temporary shape and reduce a volume of the cup-receiving cavity during exposure of the first deformable portion to an external impact force,
wherein the seat bottom includes a seat pad arranged to lie alongside the cupholder support, the cup receiver includes an outer exterior portion arranged to extend away from the seat pad and configured to include the first deformable portion of the side wall of the cup receiver and an inner exterior portion arranged to extend toward the seat pad and configured to deform when exposed to an external impact force, and
wherein the seat bottom is formed to include a rear ridge, a front ridge, and a central basin located between the rear and front ridges and the cup receiver of the cupholder is located in the central basin.

11. The juvenile seat of claim 10, further comprising a seat back extending upwardly from the seat bottom and the rear ridge is arranged to lie in a position between the seat back and the front ridge.

12. A juvenile seat comprising
a seat bottom,
a cupholder support coupled to the seat bottom, and
a cupholder mounted on the cupholder support, the cupholder including a cup receiver having a floor and a side wall arranged to cooperate with the floor to form a cup-receiving cavity, wherein the side wall includes a first deformable portion that is arranged to extend away from the cupholder support and to deform from an initial shape and move relative to the floor to assume a different temporary shape and reduce a volume of the cup-receiving cavity during exposure of the first deformable portion to an external impact force,
wherein the cupholder support includes a floor-support wall and a side-support wall arranged to extend upwardly from the floor-support wall and cooperate with the floor-support wall to form a support cavity receiving an inner section of the cup receiver to cause an outer section of the cup receiver including the first deformable portion of the side wall of the cup receiver to lie outside the support cavity; and
wherein the seat bottom is formed to include a rear ridge, a front ridge, and a central basin located between the rear and front ridges and the cup receiver of the cupholder is located in the central basin.

13. The juvenile seat of claim 12, wherein the floor of the cup receiver includes a mounted portion arranged to lie in a stationary position on the floor-support wall of the cupholder support and an unmounted portion coupled to the first deformable portion of the side wall of the cup receiver and arranged to extend away from the cupholder support to lie outside of the support cavity formed in the cupholder support.

* * * * *